US009053567B2

(12) United States Patent
Hayashi

(10) Patent No.: US 9,053,567 B2
(45) Date of Patent: Jun. 9, 2015

(54) STEREOSCOPIC IMAGE PROCESSING DEVICE AND STEREOSCOPIC IMAGE PROCESSING METHOD

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/033,594

(22) Filed: Sep. 23, 2013

(65) Prior Publication Data

US 2014/0022244 A1 Jan. 23, 2014

Related U.S. Application Data

(63) Continuation of application No. PCT/JP2012/001870, filed on Mar. 16, 2012.

(30) Foreign Application Priority Data

Mar. 24, 2011 (JP) ................................. 2011-065184

(51) Int. Cl.
*G06T 19/00* (2011.01)
*H04N 13/00* (2006.01)

(52) U.S. Cl.
CPC ............ *G06T 19/00* (2013.01); *H04N 13/0022* (2013.01); *H04N 2013/0081* (2013.01)

(58) Field of Classification Search
CPC ............................ G06T 15/00; H04N 13/0022
USPC .......................................................... 345/419
See application file for complete search history.

(56) References Cited

U.S. PATENT DOCUMENTS

| 6,449,309 | B1* | 9/2002 | Tabata ..................... 375/240.01 |
| 6,584,219 | B1 | 6/2003 | Yamashita et al. |
| 7,643,025 | B2* | 1/2010 | Lange ............................ 345/419 |
| 2005/0078108 | A1* | 4/2005 | Swift et al. .................... 345/419 |
| 2005/0117215 | A1* | 6/2005 | Lange ............................ 359/462 |
| 2009/0244268 | A1 | 10/2009 | Masuda et al. |
| 2010/0085423 | A1* | 4/2010 | Lange ............................ 348/46 |
| 2010/0166319 | A1 | 7/2010 | Zhang |
| 2010/0323609 | A1 | 12/2010 | Aramaki |
| 2011/0013288 | A1* | 1/2011 | Ohata .......................... 359/689 |
| 2011/0102425 | A1* | 5/2011 | Ohta ............................. 345/419 |

(Continued)

FOREIGN PATENT DOCUMENTS

| JP | 2005-184377 A | 7/2005 |
| JP | 2009-239388 A | 10/2009 |

(Continued)

*Primary Examiner* — Edward Martello
(74) *Attorney, Agent, or Firm* — Birch, Stewart, Kolasch & Birch, LLP

(57) ABSTRACT

In a stereoscopic image processing device capable of displaying and/or recording stereoscopic animated images and stereoscopic still images, stereoscopic still image data representing any stereoscopic still image are extracted from predetermined stereoscopic animated image data, and the parallax amount of the stereoscopic still image represented by the extracted stereoscopic still image data is acquired. The parallax amount of the stereoscopic still image data is converted so as to be larger than the acquired parallax amount.

19 Claims, 13 Drawing Sheets

(56) References Cited

U.S. PATENT DOCUMENTS

| | | | |
|---|---|---|---|
| 2011/0187708 A1* | 8/2011 | Suzuki et al. | 345/419 |
| 2011/0261160 A1 | 10/2011 | Tadokoro et al. | |
| 2011/0292183 A1* | 12/2011 | Tajiri et al. | 348/50 |
| 2012/0076260 A1* | 3/2012 | Kitagawa et al. | 378/41 |
| 2012/0154390 A1* | 6/2012 | Narita et al. | 345/419 |
| 2012/0306860 A1* | 12/2012 | Hatta et al. | 345/419 |

FOREIGN PATENT DOCUMENTS

| | | | | |
|---|---|---|---|---|
| JP | 2010-258723 A | | 11/2010 | |
| JP | 2011-4036 A | | 1/2011 | |
| WO | WO2010/122775 | * | 10/2010 | H04N 13/04 |

* cited by examiner

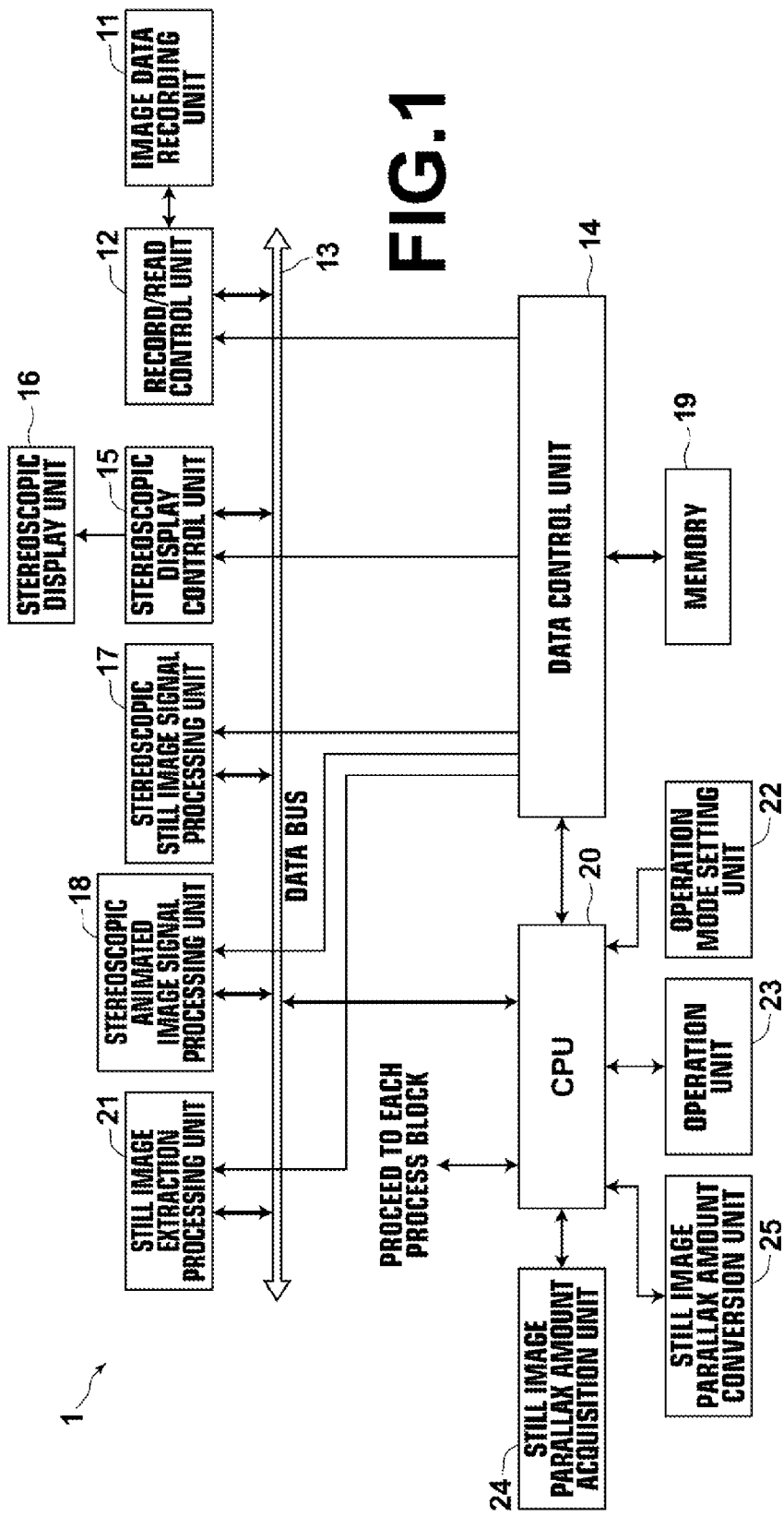

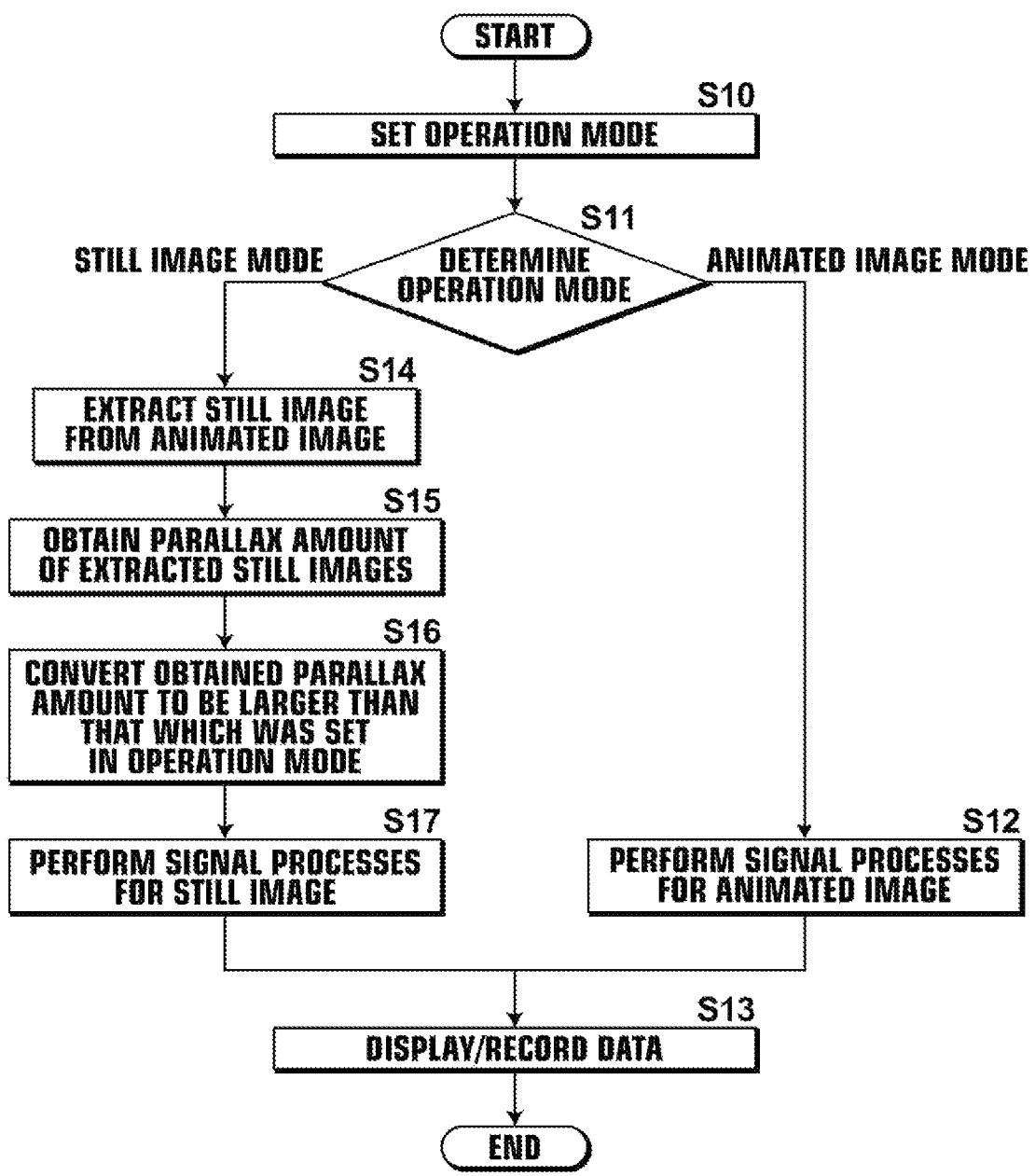

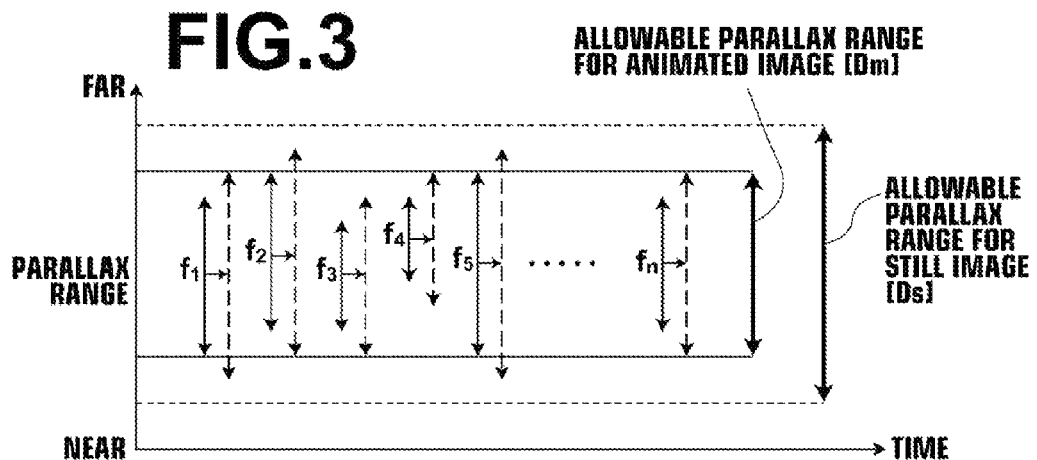
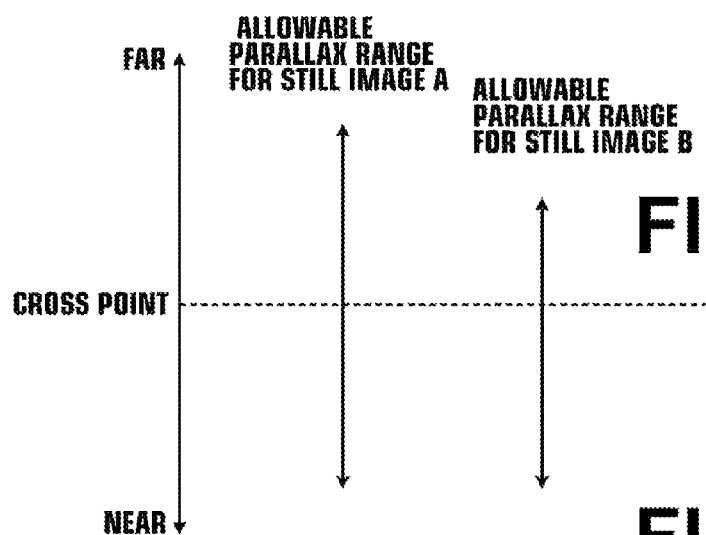
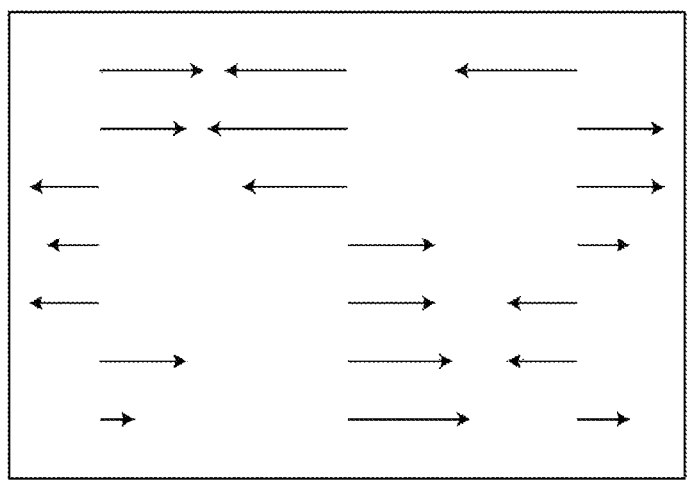

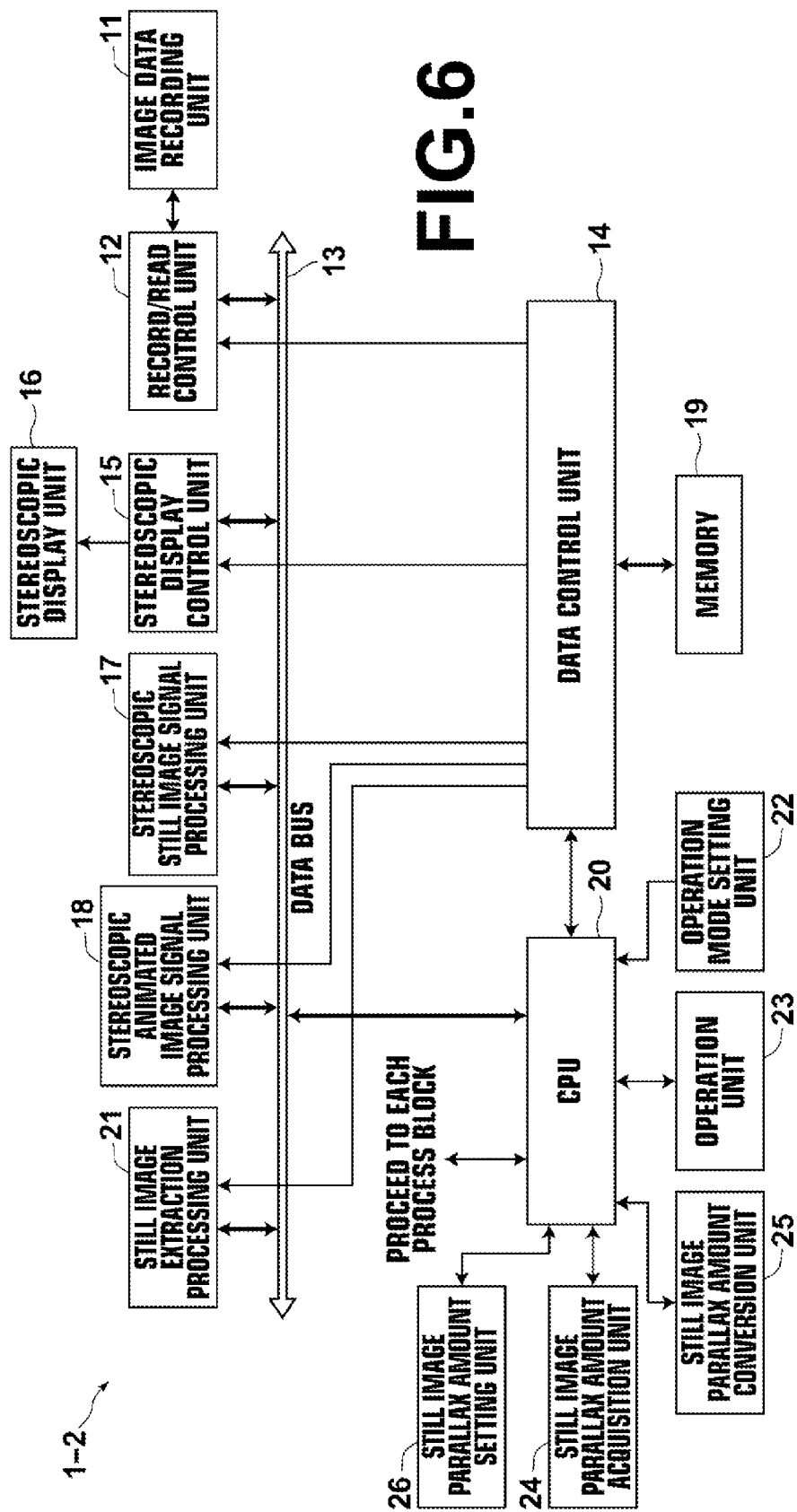

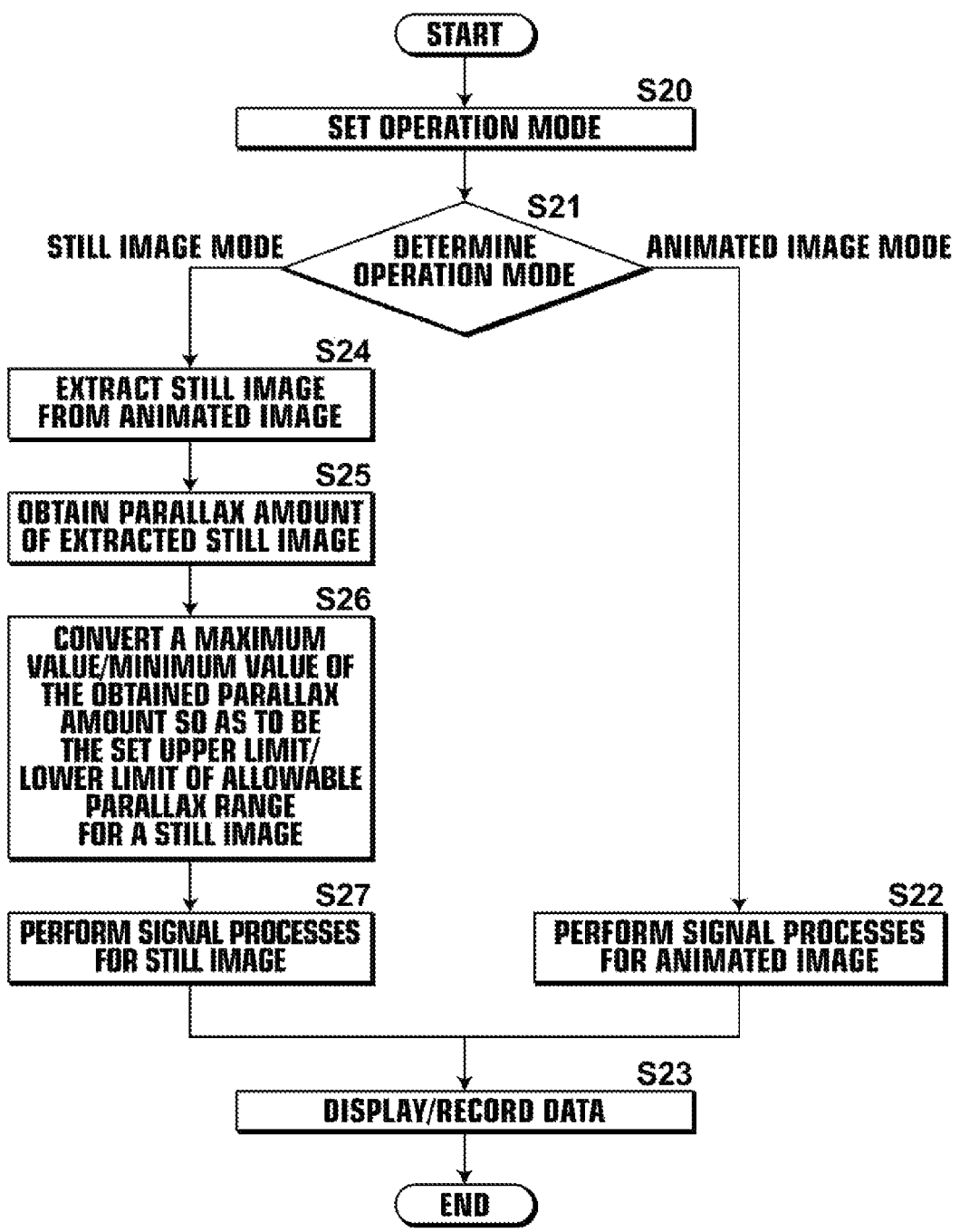

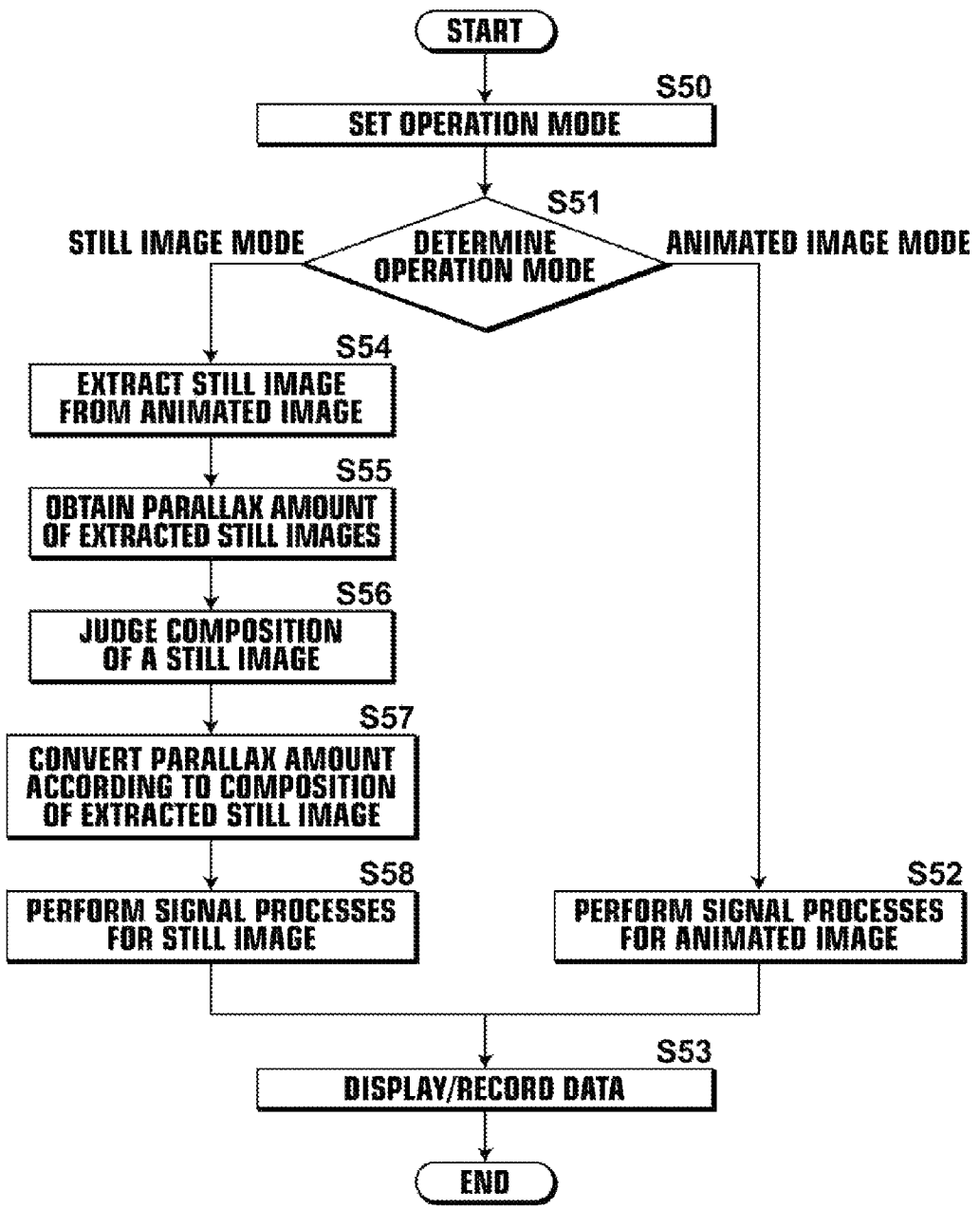

STEREOSCOPIC IMAGE PROCESSING DEVICE AND STEREOSCOPIC IMAGE PROCESSING METHOD

CROSS REFERENCE TO RELATED APPLICATIONS

This non-provisional application is a Continuation of International Application No. PCT/JP2012/001870 filed on Mar. 16, 2012, which claims the benefit of Japanese patent Application No. 2011-065184 filed in Japan on Mar. 24, 2011. The entire contents of all of the above applications are hereby incorporated by reference.

TECHNICAL FIELD

The present invention relates to a stereoscopic image processing device for handling both stereoscopic animated images and stereoscopic still images, and more specifically to a method for outputting stereoscopic still image data extracted from stereoscopic animated image data.

BACKGROUND ART

Enabling stereoscopic viewing utilizing parallax by combining a plurality of images with different viewpoints has been conventionally known. Three-dimensional images, which are displayed enabling stereoscopic viewing in such a way, can be generated in both animated images and still images.

However, in the three-dimensional images, a parallax which occurs between an observer's eyes is utilized, and thereby in the case that a parallax amount among the plurality of images is not appropriate, the observer will be caused to feel discomfort and fatigue. In particular, in the stereoscopic animated images, excessive change in parallax amount when switching each scene will increase discomfort and fatigue, and therefore discomfort and fatigue more easily occur compared to the stereoscopic still images.

Patent Document 1 (U.S. Patent Application Publication No. 20110261160) discloses an image information processing apparatus which is designed to smoothly change depth values when switching scenes, without causing discomfort and fatigue.

In contrast, stereoscopic image processing apparatuses for handling both stereoscopic animated images and stereoscopic still images have been known. Patent Document 2 (Japanese Unexamined Patent Publication No. 2005-184377) discloses an image conversion apparatus for converting two-dimensional/three-dimensional images into three-dimensional/two-dimensional still images or into three-dimensional/two-dimensional animated images to facilitate image data. Patent Documents 1 and 3 (U.S. Pat. No. 6,584,219) disclose a method for reducing changes in depth values when switching between stereoscopic animated images and stereoscopic still images so as to prevent discomfort and fatigue.

DISCLOSURE OF THE INVENTION

However, since stereoscopic animated images are considered to have a greater effect (discomfort and fatigue) on the human body than stereoscopic still images, amounts of parallax of stereoscopic animated images are ordinarily suppressed to be lower than those of stereoscopic still images. Even in the case that the amounts of parallax are suppressed to be lower in such a manner, the stereoscopic animated images can give a stereoscopic effect by virtue of movement of subjects (such as rotating, moving in a depth direction, crossing in the front and rear of other subjects having different depths). Thereby, the stereoscopic effect will not have to be significantly deteriorated. In contrast, there are cases that if stereoscopic still images are extracted from stereoscopic animated images, in which the amounts of parallax have been reduced in consideration of adverse effects on the human body, and are reproduced without any changes, sufficient stereoscopic effects will not be obtained.

The present invention has been developed in view of the foregoing circumstances. It is an object of the present invention to provide a stereoscopic image processing device for handling both stereoscopic animated images and stereoscopic still images as well as a stereoscopic image processing method, by which the stereoscopic still images represented by stereoscopic still image data extracted from stereoscopic animated data will have sufficient stereoscopic effect.

The stereoscopic image processing device according to the present invention, which is capable of displaying and/or recording a stereoscopic animated image and a stereoscopic still image, comprises:

a stereoscopic still image extraction unit for extracting stereoscopic still image data representing any stereoscopic still image from predetermined stereoscopic animated data;

a still image parallax amount acquisition unit for acquiring the amount of parallax of the stereoscopic still image represented by the stereoscopic still image data which has been extracted by the stereoscopic still image extraction unit; and a still image parallax amount conversion unit for converting the amount of parallax of the stereoscopic still image data so as to be larger than the amount of parallax acquired by the still image parallax amount acquisition unit.

In this case, the expressions "a stereoscopic animated image" and "a stereoscopic still image" refer to images from which an observer can perceive a stereoscopic effect when the images are displayed on a monitor, individually.

Further, acquiring the amount of parallax by the still image parallax amount acquisition unit may be carried out by reading information of a range image and the like which has been previously calculated and recorded.

It should be noted that in the stereoscopic image processing device according to the present invention, the still image parallax amount conversion unit may convert the amount of parallax of the stereoscopic still image data so as to be larger than the amount of parallax acquired by the still image parallax amount acquisition unit and such that a maximum value and a minimum value of the amount of parallax of the stereoscopic still image correspond to an upper limit value and a lower limit value of an allowable parallax range of the stereoscopic still image, respectively.

In this case, the expression "an allowable parallax range of the stereoscopic still image" refers to a range of amounts of parallax, in which physical safety of the human body is ensured, in the stereoscopic still images. The allowable parallax range may be set separately for a far direction, i.e., a retreating direction and a near direction, i.e., a projecting direction starting from a cross point at which the amount of parallax becomes 0 (a display surface on which a stereoscopic still image is displayed), as shown in FIG. 4.

The expression "a maximum value of the amount of parallax" according to the present invention refers to a maximum value of the amount of parallax in the far direction, and the expression "a minimum value of the amount of parallax" refers to a maximum value of the amount of parallax in the near direction. Further, the expression "an upper limit value of an allowable parallax range" refers to an allowable amount of parallax in the far direction, and the expression "a lower limit value of a amount of parallax" refers to an allowable amount of parallax in the near direction.

Further, in the stereoscopic image processing device according to the present invention, a width from a cross point at which the amount of parallax becomes 0 to the upper limit value of the allowable parallax range may be different from a width from the cross point to the lower limit value of the allowable parallax range.

Further, in the stereoscopic image processing device according to the present invention, the still image parallax amount conversion unit may convert the amount of parallax of the stereoscopic still image data by multiplying a ratio between the width of the allowable parallax range of the stereoscopic still image and the width of the allowable parallax range of the stereoscopic animated image so as to be larger than the parallax acquired by the still image parallax amount acquisition unit.

Moreover, in the stereoscopic image processing device according to the present invention, the ratios to be multiplied may differ between the front side and the back side of the cross point at which the amount of parallax becomes 0.

In the stereoscopic image processing device according to the present invention, the device may further include an intended use setting unit which sets an intended use of the stereoscopic still image represented by the stereoscopic still image data which has been extracted by the stereoscopic still image extraction unit, and the still image parallax amount conversion unit may convert the amount of parallax of the stereoscopic still image data so as to be larger than the amount of parallax acquired by the still image parallax amount acquisition unit, on the basis of the intended use set by the intended use setting unit.

Further in the stereoscopic image processing device according to the present invention, the intended use setting unit may be capable of setting printing and screen display as the intended use, and the still image parallax amount conversion unit may make the converted amount of parallax smaller than that when screen display is set, in the case that the intended use setting unit sets the intended use to printing.

Further, in the stereoscopic image processing device according to the present invention, the intended use setting unit may be capable of setting screen display for each of a plurality of sizes of display surfaces as the intended use, and the still image parallax amount conversion unit may reduce the converted amount of parallax more as the size of the display surface for screen display, which has been set, becomes greater, in the case that the intended use is set as screen display.

In the stereoscopic image processing device according to the present invention, the device may further include a still image analysis unit for analyzing the composition of the stereoscopic still image represented by the stereoscopic still image data which has been extracted by the stereoscopic still image extraction unit, and the still image parallax amount conversion unit may convert the amount of parallax of the stereoscopic still image data so as to be larger than the amount of parallax acquired by the still image parallax amount acquisition unit, on the basis of analysis results by the still image analysis unit.

Further, in the stereoscopic image processing device according to the present invention, the still image parallax amount conversion unit may make the converted amount of parallax smaller than that of a composition in which a subject does not exist, in the case that the still image analysis unit judges that the stereoscopic still image represented by the stereoscopic still image data, which has been extracted by the stereoscopic still image extraction unit, has a composition, in which a subject occupying a predetermined area or more exists in the front of the cross point where the amount of parallax becomes 0.

Further, in the stereoscopic image processing device according to the present invention, the still image parallax amount conversion unit may make the converted amount of parallax larger than that of a composition in which a subject does not exist, in the case that the still image analysis unit judges that the stereoscopic still image represented by the stereoscopic still image data which has been extracted by the stereoscopic still image extraction unit has a composition having a continuous and intermittent pattern in a depth direction and including the subject which occupies a predetermined area or less.

A stereoscopic image processing method according to the present invention that utilizes the stereoscopic image processing device for being capable of displaying and/or recording a stereoscopic animated image and a stereoscopic still image comprises the steps of:

extracting a stereoscopic still image data representing any stereoscopic still image from predetermined stereoscopic animated data;

acquiring the amount of parallax of the stereoscopic still image represented by the extracted stereoscopic still image data; and converting the amount of parallax of the stereoscopic still image data so as to be larger than the acquired amount of parallax.

It should be noted that in the stereoscopic image processing method according to the present invention, the amount of parallax of the stereoscopic still image data may be converted so as to be larger than the acquired amount of parallax and such that a maximum value and a minimum value of the amount of parallax of the stereoscopic still image correspond to an upper limit value and a lower limit value of an allowable parallax range of the stereoscopic still image, individually.

In this case, the expression "an allowable parallax range of the stereoscopic still image" refers to a range of amounts of parallax, in which physical safety of the human body is ensured, in the stereoscopic still images. The allowable parallax range may be set separately for a far direction, i.e., a retreating direction and a near direction, i.e., a projecting direction starting from a cross point at which the amount of parallax becomes 0 (a display surface on which a stereoscopic still image is displayed), as shown in FIG. 4.

The expression "a maximum value of the amount of parallax" according to the present invention refers to a maximum value of the amount of parallax in the far direction, and the expression "a minimum value of the amount of parallax" refers to a maximum value of the amount of parallax in the near direction. Further, the expression "an upper limit value of an allowable parallax range" refers to an allowable amount of parallax in the far direction, and the expression "a lower limit value of a amount of parallax" refers to an allowable amount of parallax in the near direction.

Further, in the stereoscopic image processing method according to the present invention, a width from the cross point at which the amount of parallax becomes 0 to the upper limit value of the allowable parallax range may be different from a width from the cross point to the lower limit value of the allowable parallax range.

Further, in the stereoscopic image processing method according to the present invention, the still image parallax amount conversion unit may convert the amount of parallax of the stereoscopic still image data by multiplying a ratio between the width of the allowable parallax range of the stereoscopic still image and the width of the allowable parallax range of the stereoscopic animated image so as to be larger than the acquired parallax acquired.

Moreover, in the stereoscopic image processing method according to the present invention, the ratios to be multiplied may differ between the front side and the back side of the cross point at which the amount of parallax becomes 0.

The stereoscopic image processing method according to the present invention may further set an intended use of the stereoscopic still image represented by the stereoscopic still image data which has been extracted in advance, and may convert the amount of parallax of the stereoscopic still image data so as to be larger than the acquired amount of parallax, on the basis of the set intended use.

Further in the stereoscopic image processing method according to the present invention, the converted amount of parallax may be smaller than that of the case where the intended use is set to screen display, when the intended use is set to printing.

Further, in the stereoscopic image processing method according to the present invention, the greater the size of the display surface for screen display which has been set is, the smaller the converted amount of parallax is set, in the case that the intended use is set to screen display.

The stereoscopic image processing method according to the present invention may analyze the composition of the stereoscopic still image represented by the extracted stereoscopic still image data, and may convert the amount of parallax of the stereoscopic still image data so as to be larger than the acquired amount of parallax, on the basis of the analysis results.

Further, in the stereoscopic image processing method according to the present invention, the converted amount of parallax may be set smaller than that of a composition in which a subject does not exist, in the case that it is judged that the stereoscopic still image represented by the extracted stereoscopic still image data has a composition, in which a subject occupying an area less than a predetermined area exists in the front of the cross point where the amount of parallax becomes 0.

Further, in the stereoscopic image processing method according to the present invention, the converted amount of parallax may be set larger than that of a composition in which a subject does not exist, in the case that it is judged that the stereoscopic still image represented by the extracted stereoscopic still image data has a composition having a continuous and intermittent pattern in a depth direction and including a subject which occupies a predetermined area or less.

According to the stereoscopic image processing device and the stereoscopic image processing method of the present invention, the stereoscopic image processing device that is capable of displaying and/or recording stereoscopic animated images and stereoscopic still images extracts stereoscopic still image data representing any stereoscopic still image from a predetermined stereoscopic animated image data, acquires the amount of parallax of a stereoscopic still image represented by the extracted stereoscopic still image, and converts the amount of parallax of the stereoscopic still image data so as to be larger than the acquired amount of parallax. This will cause the amount of parallax of the stereoscopic still images to become larger than that of the stereoscopic animated images so that an observer can obtain a sufficient stereoscopic effect when reproducing the stereoscopic still images.

Further, in the case that the predetermined stereoscopic animated image data is constituted by an amount of parallax within the allowable range in which physical safety of the human body is ensured, combining the safety of the human body related to the stereoscopic animated images and the advantageous effect of stereoscopic effect related to the stereoscopic still images can be realized.

BRIEF DESCRIPTION OF THE DRAWINGS

FIG. 1 is a block diagram that illustrates the configuration of a stereoscopic image processing device according to a first embodiment of the present invention, FIG. 2 is a flow chart that illustrates an operation of the stereoscopic image processing device of FIG. 1, FIG. 3 is a diagram that explains a parallax amount conversion method executed by a still image parallax amount conversion unit of FIG. 1, FIG. 4 is a diagram that explains an allowable parallax range of a still image, FIG. 5 is a schematic diagram of a shift amount to the right or the left for each point within an image;

FIG. 6 is a block diagram that illustrates the configuration of a stereoscopic image processing device according to a second embodiment of the present invention, FIG. 7 is a flow chart that illustrates an operation of the stereoscopic image processing device of FIG. 6, FIG. 15 is a flow chart that illustrates an operation of the stereoscopic image processing device of FIG. 14.

BEST MODE FOR CARRYING OUT THE INVENTION

Figure 8:
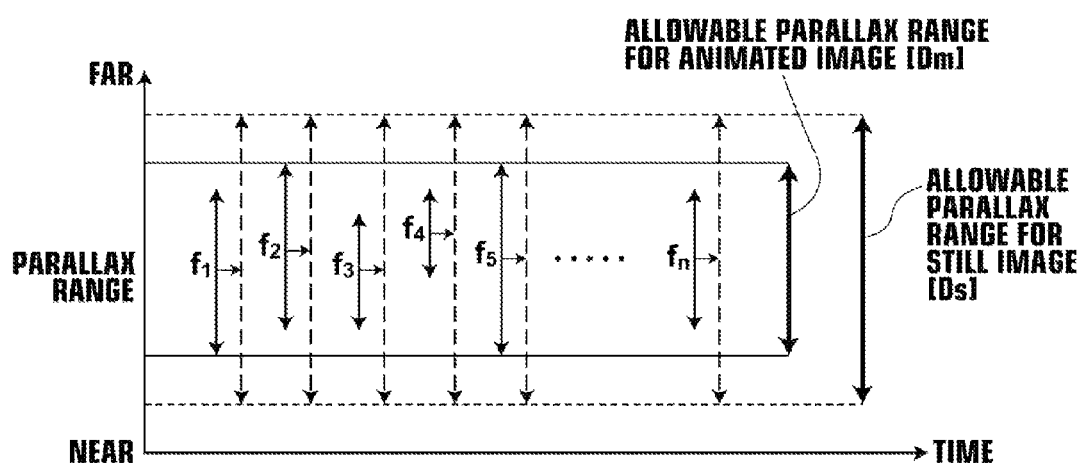
FIG. 8 is a diagram that explains a parallax amount conversion method executed by a still image parallax amount conversion unit of FIG. 6.

Hereinafter, embodiments of a stereoscopic image processing device 1 according to a first embodiment of the present invention will be described with reference to the drawings. FIG. 1 is a block diagram that illustrates the configuration of the stereoscopic image processing device 1, FIG. 2 is a flow chart that illustrates an operation of the stereoscopic image processing device 1 of FIG. 1, FIG. 3 is a diagram that explains a parallax amount conversion method executed by a still image parallax amount conversion unit 25 of FIG. 1, FIG. 4 is a diagram that explains an allowable parallax range of a still image.

As shown in FIG. 1, the stereoscopic image processing device 1 according to the present embodiment capable of displaying and/or recording stereoscopic animated images and stereoscopic still images comprises a record/read control unit 12 that controls recording and reading information into and from an image data recording unit 11, for example, a removable medium and the like, in which stereoscopic animated image data is recorded; a stereoscopic display control unit 15 connected to a stereoscopic display unit 16 constituted by LCD's, which controls display of the stereoscopic still images and the stereoscopic animated images on the stereoscopic display unit 16; a stereoscopic still image signal processing unit 17 which performs image processing on image data for still images; a stereoscopic animated image signal processing unit 18 which performs image processing on image data for stereoscopic animated images; a still image extraction unit 21 which extracts any stereoscopic still image data from stereoscopic animated image data; and a CPU 20, each of which is connected to a data bus 13. Each of the control units and processing units is connected to a data control unit 14, and data transmission among these control units and processing units via the data bus 13 is controlled by the data control unit 14. This data control unit 14 is connected to a memory 19.

Further, the record/read control unit 12, the stereoscopic display control unit 15, a stereoscopic still image signal processing unit 17, the stereoscopic animated image signal processing unit 18 and the still image extraction processing unit 21 are connected to the CPU 20 as well (not shown), and processing carried out in these control units and processing units is controlled by the CPU 20. The CPU 20 is connected to a operation unit 23 constituted by a power switch, various kinds of setting switches, a keyboard, a mouse and the like, which are provided on a main body of the stereoscopic image processing device 1.

Further, the CPU 20 is connected to an operation mode setting unit 22 for setting an operation mode to a stereoscopic animated image mode or a stereoscopic still image mode. The operation mode setting unit 22 is capable of setting the operation mode to that desired by a user, which is input by the user operating the operation unit 23. The CPU 20 also functions as a judgment unit for judging whether the operation mode set by the operation mode setting unit 22 is the stereoscopic animated image mode or the stereoscopic still image mode.

Further, the CPU 20 is connected to a still image parallax amount acquisition unit 24 and a still image parallax amount conversion unit 25, which will be described later.

Further, the stereoscopic image processing device 1 includes a microphone and a speaker. The microphone is connected via an A/D converter to the data bus 13 and the speaker is connected via an amplifier and a D/A converter to the data bus 13.

The stereoscopic display control unit 15 is designed to stereoscopically display the stereoscopic animated data and the stereoscopic still image data on the stereoscopic display unit 16. The stereoscopic display control unit 15 enables stereoscopic display by performing stereoscopic display processing adapted to a stereoscopic display system of the stereoscopic display unit 16. It should be noted that in the present embodiment, any known system may be employed for the stereoscopic display.

For example, a system for performing stereoscopic viewing by using a naked eye parallel method that arranges and displays an image for a right eye and an image for a left eye, or a lenticular system that enables a stereoscopic display by attaching lenticular lenses on the stereoscopic display unit 16 and displaying an image for a right eye and an image for a left eye on a display surface of the stereoscopic display unit 16 to cause the image for a left eye and the image for a right eye to enter the right and left eyes, can be used. Further, stereoscopic display may be achieved using a scanning backlight system, where optical paths of backlights of the stereoscopic display unit 16 are optically separated corresponding to the left and right eyes in an alternated manner, and the image for a left eye and the image for a right eye are alternately displayed on the display surface of the stereoscopic display unit 16 synchronously with the separation of the backlights to the left or the right.

The stereoscopic display unit 16 is modified according to the type of stereoscopic display. For example, if the stereoscopic display system is a lenticular system, lenticular lenses are attached on the display surface of the stereoscopic display unit 16. If the stereoscopic display system is a scanning backlight system, an optical element for changing the directions of the light beams from the left and right images is attached on the display surface of the stereoscopic display unit 16.

The stereoscopic still image signal processing unit 17 performs the image processing on the stereoscopic still image data for stereoscopic still images so as to improve the quality of the stereoscopic still images represented by the stereoscopic still image data. The image processing for the stereoscopic still images includes a noise reduction process for reducing noise components within the stereoscopic still image data, a contour enhancement process for extracting contour components to enhance the extracted contour components, a filtering process for damping or enhancing particular spatial-frequency components, a color correction process for correcting color balance of the stereoscopic still images, and the like.

The stereoscopic animated image signal processing unit 18 performs image processing on the stereoscopic animated image data for stereoscopic animated still image so as to improve the quality of the stereoscopic animated images represented by the stereoscopic animated data. The image processing for the stereoscopic animated images includes a noise reduction process for reducing noise components within the stereoscopic animated image data, a contour enhancement process for extracting contour components to enhance the extracted contour components, a filtering process for damping or enhancing particular spatial-frequency components, a color correction process for correcting color balance of the stereoscopic animated images, and the like.

The still image extraction processing unit 21 extracts stereoscopic still image data representing any stereoscopic still images from predetermined stereoscopic animated image data which have been previously selected by a user from among the stereoscopic animated data recorded in the image data recording unit 11 or the memory 19. For example, a method for selecting any stereoscopic still image from the stereoscopic still image data enables selection by operating the operation unit 23 in desired scenes while the user keeps watching stereoscopic animated images reproduced in the stereoscopic display unit 16. In this case, a single stereoscopic still image or a plurality of frames for different scenes may be extracted. Further, a known technique can be adopted as a method for extracting stereoscopic still image data from stereoscopic animated images.

The still image parallax amount acquisition unit 24 acquires the amount of parallax of the stereoscopic still images represented by the stereoscopic still image data which have been extracted by the still image extraction processing unit 21. The amount of parallax can be acquired by detecting coordinate values of a plurality of sets of feature points having the same features in the still images for the right and left eyes which constitute the stereoscopic still images and by calculating a shift amount between the still images for the right eye and the still image for the left eye. Further, the feature points between the still images for the right eye and the still images for the left eyes shift in opposite directions, between a projecting direction and a depth (retreating) direction from the display surface on which the stereoscopic still images are displayed, i.e., in the front side and in the back side of the cross point. Therefore, a shift direction is also calculated when an amount of parallax is obtained. In the case that the stereoscopic animated image data, from which the stereoscopic still image date have been extracted, is constituted by files containing range images as accompanying information, which are data representing a shift amount to the right or the left of each point within the images as images, this accompanying information is read to acquire the amount of parallax. The method for acquiring the amount of parallax is not limited to the above, but well-known methods can also be used.

The still image parallax amount conversion unit 25 is designed to convert the amount of parallax acquired by the still image parallax amount acquisition unit 24. The still image parallax amount conversion unit 25 converts the amount of parallax of the stereoscopic still image data so as to be larger than the acquired amount of parallax. FIG. 5 illustrates a schematic diagram of a shift amount to the right or the left for each point within an image. In FIG. 5, the further apart from the cross point the feature point is in the depth direction, the longer a shift amount, i.e., the length of an arrow, becomes. In addition, the directions of the shift, i.e., the directions of the arrows differ between the front and the back of the cross point. Thus, the amount of parallax is converted by transforming the still images for the right eye and/or the still images for the left eye so that the lengths of the arrows become longer in FIG. 5. Since the amount and direction to increase the shift amount for each point within the images differ, the images are transformed by using a non-linear geometric transform, called warping, such that the shift amount, i.e., the amount of parallax, becomes large. Warping locally distorts an image, i.e., warps and transforms an image, for example. In general, an image is divided into a plurality of triangular patches and transformation is carried out for each triangular patch. It should be noted that regarding a specific method for transforming images by using a warping, the technique disclosed in U.S. Patent Application Publication No. 20100166319 can be employed.

In this case, the amount of parallax acquired by the still image parallax amount acquisition unit 24 is the amount of parallax of the stereoscopic still image extracted from the stereoscopic animated data, i.e., the amount of parallax of a single scene within the stereoscopic animated data. If the amount of parallax of the stereoscopic still image data is converted so as to be larger than the acquired amount of parallax, the amount of parallax of the stereoscopic still image becomes larger than the amount of parallax of the stereoscopic animated images from which the stereoscopic still image data have been extracted. Further, the conversion of the amount of parallax by the still image parallax amount conversion unit 25 will be described later. The stereoscopic image processing device 1 according to the present embodiment is configured as described above.

Next, a stereoscopic image processing method using the stereoscopic image processing device 1 according to the present embodiment will be described with reference to the drawings. As illustrated in FIG. 2, first, in the stereoscopic image processing device 1 according to the present embodiment, an operation mode setting unit 2 sets an operation mode which has been input by the user (S10).

Next, the CPU judges whether the operation mode set by the operation mode setting unit 22 is an animated mode or a still image mode (S11). In the case that the CPU judges that it is the animated mode (S10; animated mode), the stereoscopic signal processing unit 18 performs the signal processes for stereoscopic animated images as described above on the predetermined stereoscopic animated data which have been previously selected by the user (S12). Then, the display control unit 15 displays the stereoscopic animated images represented by the stereoscopic animated image data, on which the signal processes have been conducted, on the stereoscopic display unit 16, or the record/read control unit 12 records the stereoscopic animated image data, on which the signal processes have been conducted, on the image data recording unit 11 (S13), and a series of processes is completed.

In this case, the user has previously operated and set the operation unit 23 to display the stereoscopic animated images on the stereoscopic display unit 16 or to record the stereoscopic animated images on the image data recording unit 11.

In contrast, in Step S11, in the case that it is judged that the operation mode is the still image mode (S10; still image mode), the still image extraction unit 21 extracts the stereoscopic still image data, which represents any single stereoscopic still image, from the predetermined stereoscopic animated image data which have been previously selected by the user from among the stereoscopic animated image data recorded in the image data recording unit 11 or the memory 19 (S14).

Next, the still image parallax amount acquisition unit 24 acquires the parallax of the stereoscopic still images represented by the stereoscopic still image data which have been extracted by the still image extraction unit 21, as described above (S15). Then, the still image parallax amount conversion unit 25 converts the amount of parallax of the stereoscopic still image data so as to be larger than the amount of parallax extracted by the still image parallax amount acquisition unit 24 (S16).

In general, as shown in FIG. 3, the allowable parallax range $D_s$, in which physical safety of the human body is ensured in the stereoscopic still images, is set to be larger than the allowable parallax range $D_m$ in the stereoscopic animated images. This follows that there are cases when the stereoscopic still image data is extracted from the stereoscopic animated image data, in which the amount of parallax has been already set such that safety of the human body is ensured at the time of the reproduction, the amount of parallax of the stereoscopic still images represented by the extracted stereoscopic still image data is much smaller than those within the allowable parallax range $D_s$, and thereby the stereoscopic effect cannot be sufficiently obtained at the time of the reproduction.

In the stereoscopic image processing device 1 of the present embodiment, the still image parallax amount conversion unit 25 converts the amount of parallax of the stereoscopic still image data so that the amount of parallax of each frame $f_n$ extracted from the stereoscopic animated image data, i.e., the amount of parallax of the stereoscopic still images becomes larger than the original amount of parallax, i.e., the amount of parallax of the stereoscopic animated images represented by the stereoscopic animated image data which is an extraction source, as shown in FIG. 3. At this time, the converted amount of parallax is set to values within the allowable parallax range $D_s$ of the stereoscopic still images.

In this case, in FIG. 3, the expression "the amount of parallax becomes larger" refers to a case that a maximum value (the tip of an up-pointing arrow in the figure) of the amount of parallax of the stereoscopic still images becomes positioned at a further upper position in the far side (the upper side from . . . in the figure) from the cross point where the amount of parallax becomes 0 or a case that a minimum value (the tip of a down-pointing arrow in the figure) of the amount of parallax of the stereoscopic still images becomes positioned at a further lower position.

As described above, observers can obtain the stereoscopic effect sufficiently in reproduction of the stereoscopic still images by causing the amount of parallax of the stereoscopic still images to be larger than the amount of parallax of the stereoscopic animated images. At this time, in the case that the stereoscopic animated data, which is the extraction source, are constituted by amounts of parallax within the allowable parallax range $D_m$ in which safety of the human body is secured, both safety of the human body related to the stereoscopic animated images and the advantageous effect of stereoscopic effect related to the stereoscopic still images can be realized.

It should be noted that in the present embodiment, as shown in FIG. 3, the amount of parallax is converted to be larger such that the length starting from the display surface (i.e., the cross point), on which the stereoscopic still images are displayed, as designated by " . . . " in the figure, is the same between a far and near directions, i.e., the stereoscopic effect in a projecting direction from the display surface and the stereoscopic effect in a depth direction therefrom have the same value. However, the present invention is not limited to the above configuration. An amount of parallax which represents the stereoscopic effect in a far direction (i.e., in a depth direction) and an amount of parallax which represents the stereoscopic effect in a near direction (i.e., in a projecting direction) can be set separately.

In general, when stereoscopic images are observed, as the amount of parallax which represents the stereoscopic effect in a depth direction becomes larger, the user needs to move their eyes in directions away from each other so as to stereoscopically view the images. In particular, if the amount of parallax which represents the stereoscopic effect in a depth direction is too large for small children having narrow-set eyes, the human body will suffer more significantly therefrom. Therefore, as shown in the still image allowable parallax range B of FIG. 4, it is desirable for an allowable parallax range in a far direction to be set to be larger than an allowable parallax range in a near direction.

Next, the stereoscopic still image signal processing unit 17 performs the signal processes for stereoscopic still images, as described above, on the stereoscopic still image data representing the stereoscopic still images, the amount of parallax of which has been converted by the still image parallax amount conversion unit 25 (S17). Then, the display control unit 15 displays the stereoscopic animated images represented by the stereoscopic animated image data, on which the signal processes have been conducted, on the stereoscopic display unit 16, or the record/read control unit 12 records the stereoscopic animated image data, on which the signal processes have been conducted, on the image data recording unit 11 (S13), and thereby a series of processes are completed.

The stereoscopic still image processing device 1 according to the present embodiment performs a stereoscopic image process in the manner described above. In this case, the still image parallax amount conversion unit 25 may convert the amount of parallax just after the stereoscopic still images are extracted, when the stereoscopic still images are displayed, or when the stereoscopic still images are recorded, and the timing of the conversion may be changed appropriately.

Next, a stereoscopic image processing device 1-2 according to a second embodiment of the present invention will be described with reference to the drawings. FIG. 6 is a block diagram that illustrates the configuration of a stereoscopic image processing device 1-2, FIG. 7 is a flow chart that illustrates an operation of the stereoscopic image processing device 1-2 of FIG. 6, and FIG. 8 is a diagram that explains a parallax amount conversion method executed by the still image parallax amount conversion unit 25 of FIG. 6. It should be noted that constituent elements of the stereoscopic image processing device 1-2 according to the present embodiment as shown in FIG. 6 which are common to the stereoscopic image processing device 1 according to the above embodiment as shown in FIG. 1 will be designated by the same reference numerals, and descriptions thereof will be omitted. Only different elements will be described.

The stereoscopic image processing device 1-2 according to the present embodiment further includes a still image parallax amount setting unit 26, in addition to the configuration of FIG. 1, as shown in FIG. 6. The still image parallax amount setting unit 26 is designed to set upper limit values and lower limit values of an allowable parallax range of stereoscopic still images and is capable of setting values input by a user operating the operation unit 23 as the upper limit values and the lower limit values of the allowable parallax range. The upper limit value sand the lower limit values of the allowable parallax range are designed to be set within the allowable parallax range $D_s$, in which safety of the human body is secured, in stereoscopic still images. In the present embodiment, the upper limit values and the lower limit values of the allowable parallax range of the stereoscopic still images should be set to the upper limit value and the lower limit value of the allowable parallax range $D_s$, individually so that the sufficient stereoscopic effects can be obtained.

Next, a stereoscopic image processing method using the stereoscopic image processing device 1-2 according to the present embodiment will be described below with reference to the drawings. It should be noted that the processes in step S20 through step S25 and step S27 of FIG. 7 are the same as those in step S10 through step S15 and step S17 of FIG. 2, and therefore descriptions thereof will be omitted.

In the stereoscopic image processing device 1-2 according to the present embodiment, as shown in FIG. 7, when amounts of parallax of stereoscopic images represented by stereoscopic still image data which have been extracted by a still image parallax amount acquisition unit 24 are acquired (S25), a still image parallax amount conversion unit 25 converts the stereoscopic still image data such that the maximum value and the minimum value of the amounts of parallax acquired by the still image parallax amount acquisition unit 24 correspond to the set upper limit value and lower limit value of the allowable parallax range $D_s$ of the stereoscopic still images, individually (S26). Thus, the conversion is performed such that the maximum value of the amount of parallax in a far direction corresponds to an allowable amount of parallax in a far direction of the allowable parallax range $D_s$ and the maximum value of the amount of parallax in a near direction corresponds to an allowable amount of parallax in a near direction of the allowable parallax range D.

In general, as shown in FIG. 8, the allowable parallax range $D_s$, in which physical safety of the human body is ensured in the stereoscopic still images, is set to be larger than the allowable parallax range $D_m$ in the stereoscopic animated images. Thereby, there are cases in which the stereoscopic still image data is extracted from the stereoscopic animated image data, in which the amount of parallax has already been set such that safety of the human body is ensured at the time of reproduction, the amount of parallax of the stereoscopic still images represented by the extracted stereoscopic still image data is much smaller than those within the allowable parallax range $D_s$, and thereby the stereoscopic effect cannot be sufficiently obtained at the time of reproduction.

Accordingly, in the stereoscopic image processing device 1-2 of the present embodiment, the still image parallax amount conversion unit 25 converts the amount of parallax of the stereoscopic still image data so that the amount of parallax of each frame $f_n$ extracted from the stereoscopic animated image data, i.e., the maximum value and the minimum value of the amounts of parallax of the stereoscopic still images uniformly correspond to the upper limit value and the lower limit value of the allowable parallax range $D_s$, as shown in FIG. 8.

As described above, observers can obtain the stereoscopic effect sufficiently at the time of reproduction of the stereoscopic still images by causing the amount of parallax of the stereoscopic still images to be larger than the amount of parallax of the stereoscopic animated images. At this time, in the case that the stereoscopic animated data of the extraction source are constituted by the amount of parallax within the allowable parallax range $D_m$ in which safety of the human body is secured, both safety of the human body related to the stereoscopic animated images and the advantageous effect of stereoscopic effect related to the stereoscopic still images can be realized.

It should be noted that in the present embodiment, as shown in FIG. 8, a reference amount of parallax of the still images is set such that the length starting from the display surface (i.e., the cross point), on which the stereoscopic still images are displayed, as designated by " . . . " in the figure, is the same between a far and near directions, i.e., the stereoscopic effect in a projecting direction from the display surface and the stereoscopic effect in a depth direction therefrom have the same value. However, the present invention is not limited to the above configuration. An amount of parallax which represents the stereoscopic effect in a far direction (i.e., in a depth direction) and an amount of parallax which represents the stereoscopic effect in a near direction (i.e., in a projecting direction) can be set separately.

In general, when stereoscopic images are observed, as the amount of parallax which represents the stereoscopic effect in a depth direction becomes larger, the user needs to have the eyes move in directions away from each other so as to stereoscopically view the images. In particular, if the amount of parallax which represents the stereoscopic effect in a depth direction is too large for small children having narrow-set eyes, more adverse effects will occur to the human body. Therefore, as shown in the still image allowable parallax range B of FIG. 4, it is desirable for an allowable parallax range in a far direction is set to be larger than an allowable parallax range in a near direction.

Figure 9:
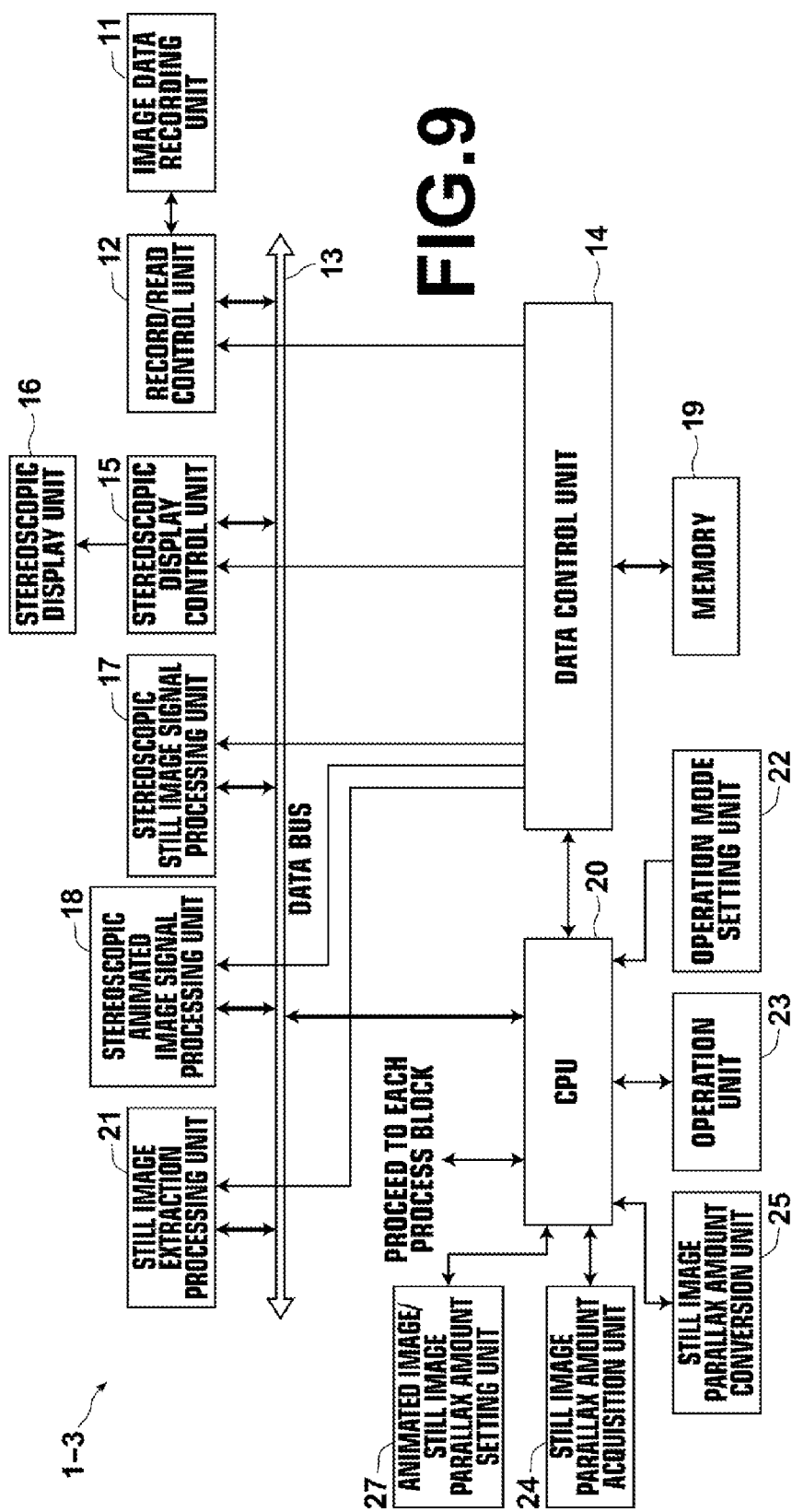
FIG. 9 is a block diagram that illustrates the configuration of a stereoscopic image processing device according to a third embodiment.
Figure 10:
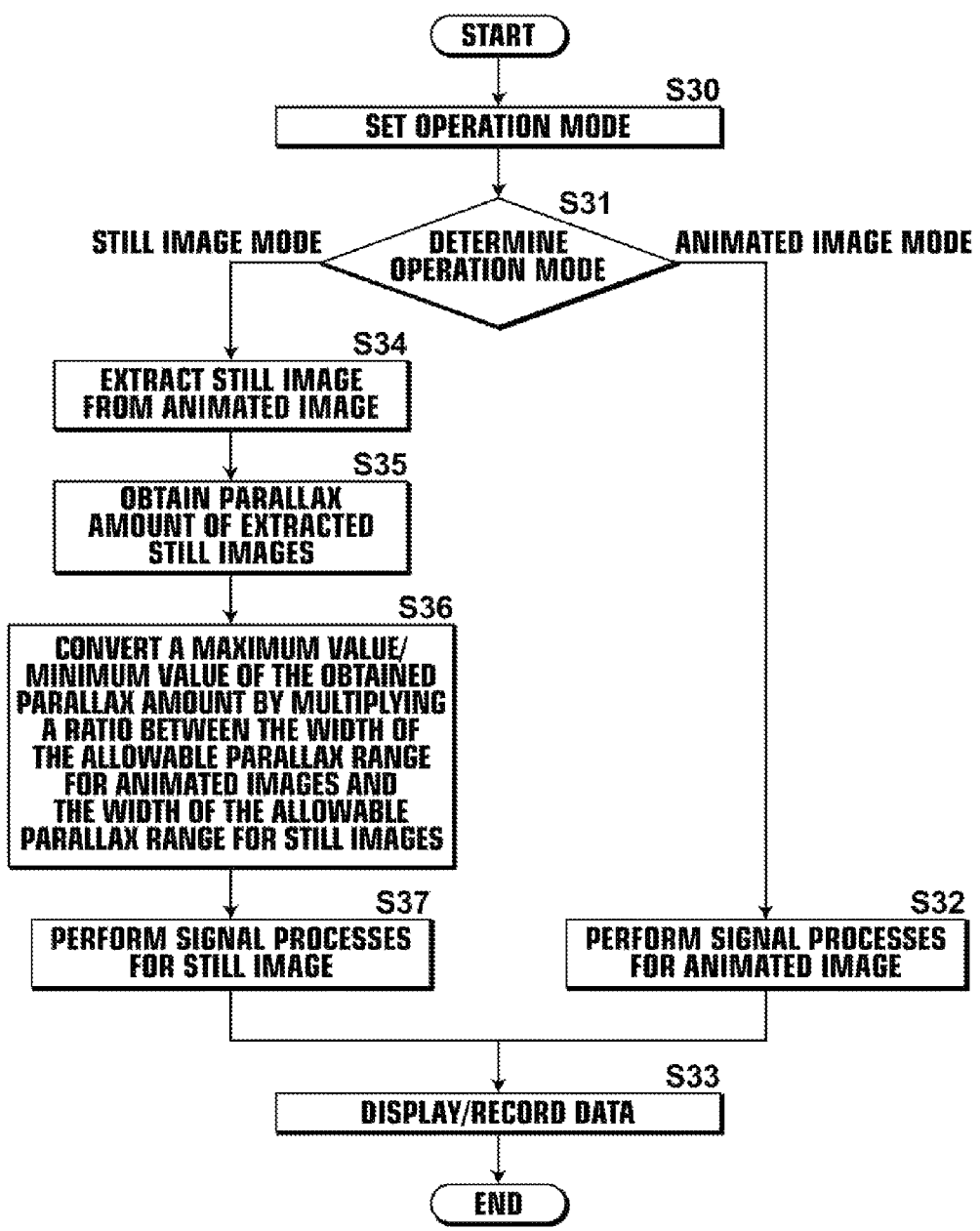
FIG. 10 is a flow chart that illustrates an operation of the stereoscopic image processing device of FIG. 9.
Figure 11:
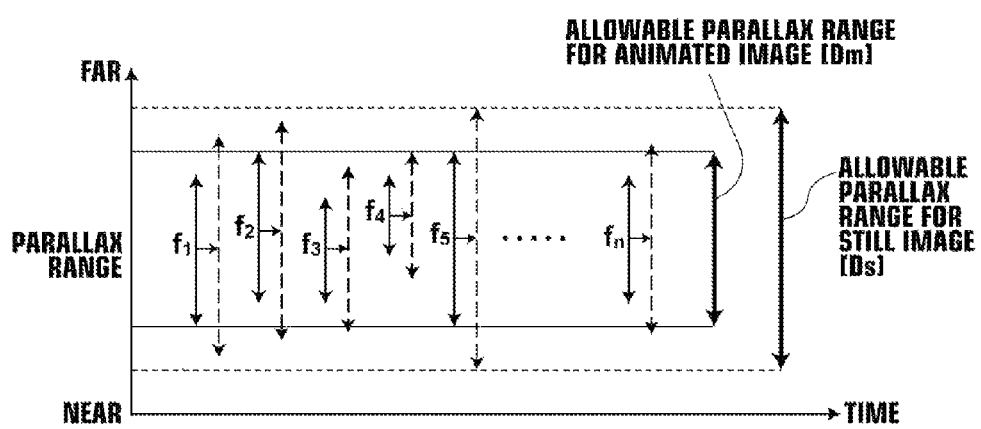
FIG. 11 is a diagram that explains a parallax amount conversion method executed by a still image parallax amount conversion unit of FIG. 9.

Next, a stereoscopic image processing method using a stereoscopic image processing device 1-3 according to a third embodiment will be described below with reference to the drawings. FIG. 9 is a block diagram that illustrates the configuration of the stereoscopic image processing device 1-3, FIG. 10 is a flow chart that illustrates an operation of the stereoscopic image processing device 1-3 of FIG. 9, and FIG. 11 is a diagram that explains a parallax amount conversion method executed by the still image parallax amount conversion unit 25 of FIG. 9. It should be noted that constituent elements of the stereoscopic image processing device 1-3 according to the present embodiment as shown in FIG. 9 which are common to the stereoscopic image processing device 1 according to the above embodiment as shown in FIG. 1 will be designated by the same reference numerals, and descriptions thereof will be omitted. Only different elements will be described.

The stereoscopic image processing device 1-3 according to the present embodiment further includes an animated image/still image parallax amount setting unit 27, in addition to the configuration of FIG. 1, as shown in FIG. 9. The animated image/still image parallax amount setting unit 27 is designed to set upper limit values and lower limit values of allowable parallax ranges of the stereoscopic animated images and the stereoscopic still images, respectively and is capable of setting values input by a user operating the operation unit 23 as the upper limit value and the lower limit value of each allowable parallax range. The upper limit value and the lower limit value of each allowable parallax range are designed to be set within the allowable parallax range $D_s$ and the allowable parallax range $D_m$ in which safety of the human body is secured, individually. In the present embodiment, the upper limit value and the lower limit value of the allowable parallax range of the stereoscopic still images should be set to the upper limit value and the lower limit value of the allowable parallax range $D_s$, and the upper limit value and the lower limit value of the allowable parallax range of the stereoscopic animated images should be set to the upper limit value and the lower limit value of the allowable parallax range $D_m$, individually, so that the sufficient stereoscopic effects can be obtained.

In this case, a parallactic angle θ which enables comfortable stereoscopic viewing has been empirically calculated through various kinds of studies. The parallactic angle θ refers to the difference between an angle of convergence which is formed when one point on a display surface is viewed and an angle of convergence which is determined by binocular parallax when a solid is viewed. Currently, findings suggest that regarding a comfortable parallax range of stereoscopic animated images in the case of high-definition TV's, a depth range within a single screen should be restrained within one degree on the premise of viewing with an interlocular distance of 6.5 cm and a display-viewing distance (a distance which is three times longer than the height of a television screen) will facilitates viewing. Therefore, in the present embodiment, the upper limit value and the lower limit value of the allowable parallax range of the stereoscopic animated images should be a value of the amount of parallax in the case that the parallactic angle is one degree and the upper limit value and the lower limit value of the allowable parallax range of the stereoscopic still images are set to be larger values than the upper limit value and the lower limit value of the allowable parallax range of the stereoscopic animated images.

Next, a stereoscopic image processing method using the stereoscopic image processing device 1-3 according to the present embodiment will be described below with reference to the drawings. It should be noted that the processes in step S30 through step S35 and step S37 of FIG. 10 are the same as those in step S10 through step S15 and step S17 of FIG. 2, and therefore descriptions thereof will be omitted.

In the stereoscopic image processing device 1-3 according to the present embodiment, as shown in FIG. 10, when the amount of parallax of stereoscopic images represented by stereoscopic still image data which have been extracted by a still image parallax amount acquisition unit 24 is acquired (S35), a still image parallax amount conversion unit 25 converts the stereoscopic still image data such that the amount of parallax acquired by the still image parallax amount acquisition unit 24 has a value obtained by multiplying a ratio between the width of the allowable parallax range $D_s$ of the stereoscopic still images and the width of the allowable parallax range $D_m$ of the stereoscopic animated image, each of which has been preliminarily set (S26).

In general, as shown in FIG. 11, the allowable parallax range $D_s$, in which physical safety of the human body is ensured in the stereoscopic still images, is set to be larger than the allowable parallax range $D_m$ in the stereoscopic animated images. Thereby, there are cases that when the stereoscopic still image data is extracted from the stereoscopic animated image data, in which the amount of parallax has been already set such that the safety of the human body is ensured at the time of the reproduction, the amount of parallax of the stereoscopic still images represented by the extracted stereoscopic still image data is much smaller than those within the allowable parallax range $D_s$, and thereby the stereoscopic effect cannot be sufficiently obtained at the time of reproduction.

Accordingly, in the stereoscopic image processing device 1-3 of the present embodiment, the still image parallax amount conversion unit 25 converts the amount of parallax of the stereoscopic still image data such that the amount of parallax of each frame $f_n$ extracted from the stereoscopic animated image data, i.e., the amount of parallax acquired by the still image parallax amount acquisition unit 24, has a value obtained by multiplying a ratio between the width of the allowable parallax range $D_s$ of the stereoscopic still images and the width of the allowable parallax range $D_m$ of the stereoscopic animated images, each of which has been preliminarily set. Thus, the stereoscopic still image data is converted so that the amount of parallax of each frame $f_n$ of the stereoscopic still images extracted by the still image parallax amount acquisition unit 24 corresponds to multiplied ratio between the width of the allowable parallax range $D_s$ of the stereoscopic still images and the width of the allowable parallax range $D_m$ of the stereoscopic animated images.

As described above, observers can obtain the stereoscopic effect sufficiently at the time of reproduction of the stereoscopic still images by multiplying a ratio between the width of the allowable parallax range $D_s$ of the stereoscopic still images and the width of the allowable parallax range $D_m$ of the stereoscopic animated images such that the amount of parallax of the stereoscopic still images becomes larger than the amount of parallax of the stereoscopic animated images. At this time, in the case that the stereoscopic animated data of the extraction source are constituted by the amount of parallax within the allowable parallax range $D_m$ in which the safety of the human body is secured, both safety of the human body related to the stereoscopic animated images and the advantageous effect of stereoscopic effect related to the stereoscopic still images can be realized.

It should be noted that in the present embodiment, as shown in FIG. 11, the reference amount of parallax of the still images and animated images is set such that the length starting from the display surface (i.e., the cross point), on which the stereoscopic still images are displayed, as designated by " . . . " in the figure, is the same in between a far and near directions, i.e., the stereoscopic effect in a projecting direction from the display surface and the stereoscopic effect in a depth direction therefrom have the same value. However, the present invention is not limited to the above, but an amount of parallax which represents the stereoscopic effect in a far direction (i.e., in a depth direction) and an amount of parallax which represents the stereoscopic effect in a near direction (i.e., in a projecting direction) can be set separately.

Therefore, the ratio to be multiplied may be different in between the front side and the back side of the cross point where the amount of parallax becomes 0.

In general, when the stereoscopic images are observed, as the amount of parallax which represents the stereoscopic effect in a depth direction becomes larger, the user needs to have the eyes move to the opposite direction each other so as to stereoscopically view the images. In particular, if the amount of parallax which represents the stereoscopic effect in a depth direction is too large for small children having narrow-set eyes, more adverse effects will occur to the human body. Therefore, as shown in the still image allowable parallax range B of FIG. 4, it is desirable for an allowable parallax range in a far direction to be set to be larger than an allowable parallax range in a near direction.

Figure 12:
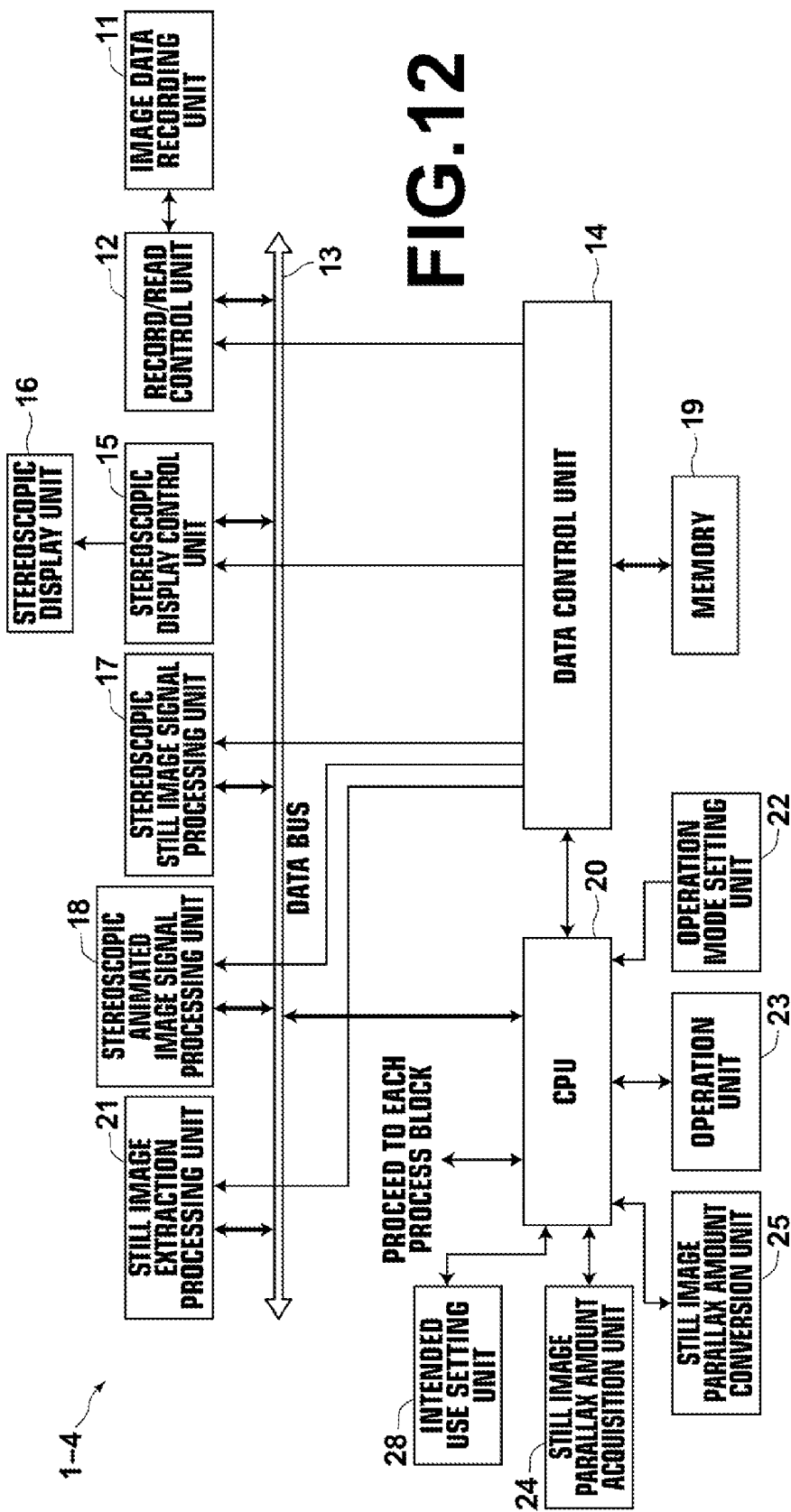
FIG. 12 is a block diagram that illustrates the configuration of a stereoscopic image processing device according to a fourth embodiment.
Figure 13:
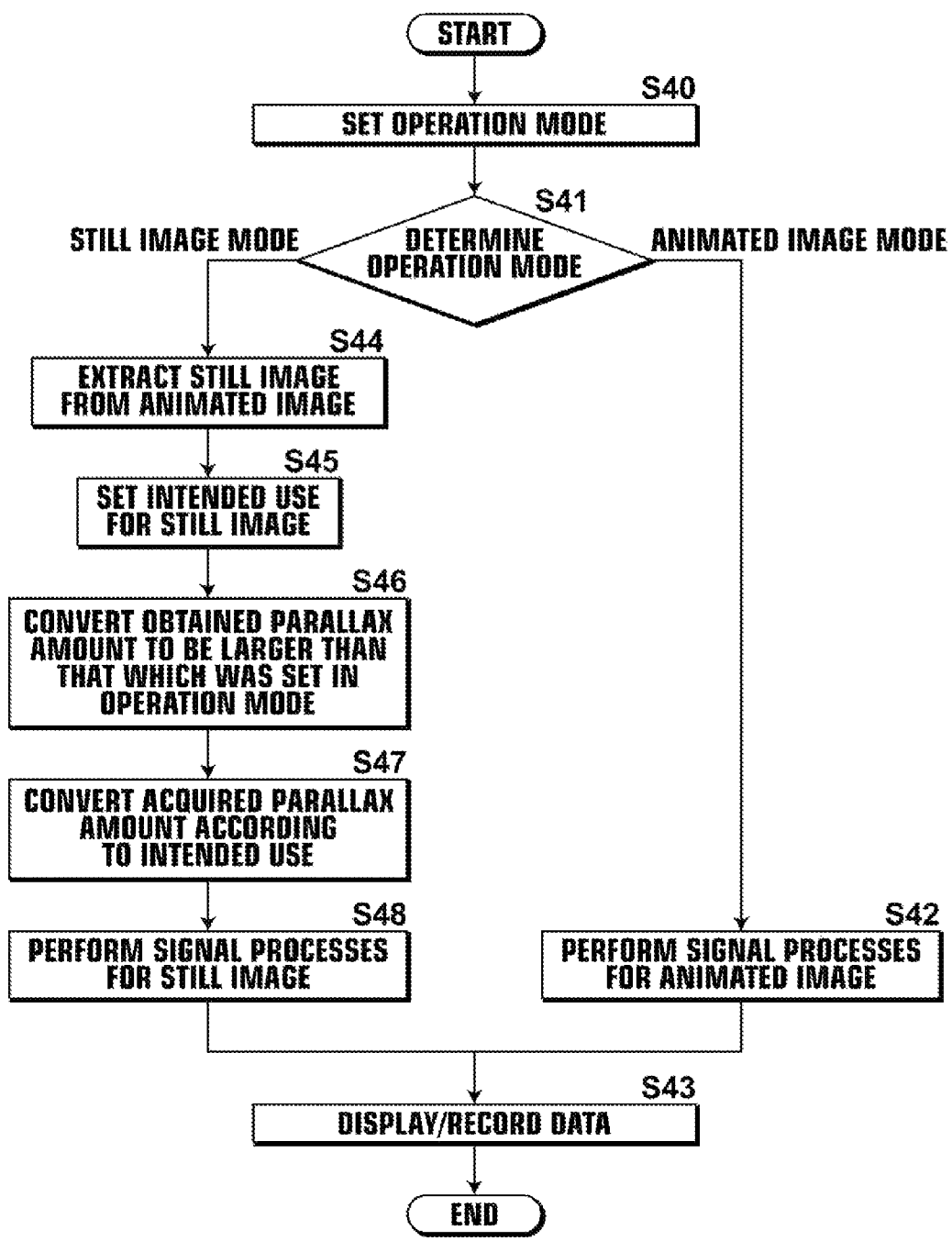
FIG. 13 is a flow chart that illustrates an operation of the stereoscopic image processing device of FIG. 12.

Next, a stereoscopic image processing device 1-4 according to a third embodiment will be described below with reference to the drawings. FIG. 12 is a block diagram that illustrates the configuration of the stereoscopic image processing device 1-4, and FIG. 13 is a flow chart that illustrates an operation of the stereoscopic image processing device 1-4 of FIG. 12. It should be noted that constituent elements of the stereoscopic image processing device 1-4 according to the present embodiment as shown in FIG. 12 which are common to the stereoscopic image processing device 1 according to the above embodiment as shown in FIG. 1 will be designated by the same reference numerals, and descriptions thereof will be omitted. Only different elements will be described.

The stereoscopic image processing device 1-4 according to the present embodiment further includes an intended use setting unit 28, in addition to the configuration of FIG. 1, as shown in FIG. 12. The intended use setting unit 28 is designed to set an intended use of the stereoscopic still images represented by the stereoscopic still image data, which have been extracted by the still image extraction processing unit 21, and is capable of setting the intended use, which has been input by the user operating the operation unit 23. In the present embodiment, the intended use can be set to a printing mode or a screen display mode, and screen display can be set for each of a plurality of sizes of display surfaces.

Next, a stereoscopic image processing method using the stereoscopic image processing device 1-4 according to the present embodiment will be described below with reference to the drawings. It should be noted that the processes in step S40 through step S44 of FIG. 13 are the same as those in step S10 through step S14 of FIG. 2, and the process in step S48 of FIG. 13 is the same as that in step S17 of FIG. 2, and therefore descriptions thereof will be omitted.

In the stereoscopic image processing device 1-4 according to the present embodiment, as shown in FIG. 13, after the still image extraction processing unit 21 extracts the stereoscopic still image data (S44), the intended use setting unit 28 sets an intended use input by the user operating the operation unit 23 (S45). Then, the still image parallax amount acquisition unit 24 acquires the amount of parallax of the stereoscopic still images represented by the stereoscopic still image data which have been extracted by the still image parallax amount acquisition unit 24 (S46), and the still image parallax amount conversion unit 25 converts the amount of parallax of the stereoscopic still image data so that the amount of parallax acquired by the still image parallax amount acquisition unit 24 becomes a value according to the intended use which has been set (S47).

The still image parallax amount conversion unit 25 converts the amount of parallax of each frame $f_n$ (i.e., stereoscopic still image) extracted from the stereoscopic animated data so as to be larger, and further converts the amount of parallax thereof so as to be smaller than the case that screen display is set as the intended use, when the intended use is set to printing. In general, in the case that a stereoscopic image is printed (lenticular printing), an image is likely to be viewed double, so that it is desirable to suppress the amount of parallax. Further, it is assumed that in the case that the intended use is set to screen display, the larger the size of the display screen which has been set is, the more adverse effects will occur to the human body when the user observes stereoscopic still images. Therefore, the amount of parallax is converted such that the amount of parallax to be changed is smaller than in the case that the size of the display surface is small.

As described above, if the amount of parallax of the stereoscopic still images is converted according to the intended use thereof such that the amount of parallax of the stereoscopic still images become larger than the amount of parallax of the stereoscopic animated images, observers can obtain a sufficient stereoscopic effect when reproducing the stereoscopic still images and further can obtain a three dimensional effect according to the intended use when using the stereoscopic still images. At this time, in the case that the stereoscopic animated image data of the extraction source is constituted by the amount of parallax within the allowable parallax range $D_m$, in which the safety of the human body is secured, both safety of the human body related to the stereoscopic animated images and the advantageous effect of stereoscopic effect related to the stereoscopic still images can be realized.

In this case, the intended use setting unit 28 is designed to be capable of setting the printing mode or the screen display mode as intended uses, and further to be capable of setting the screen display for each of a plurality of sizes of display surfaces. The present invention is not limited to the above configuration. Only either the printing or the screen display may be set, or only the screen display may be set for each of a plurality of sizes of display surfaces. Further, other intended uses may also be set. The configuration of the present embodiment may be changed as appropriate.

Figure 14:
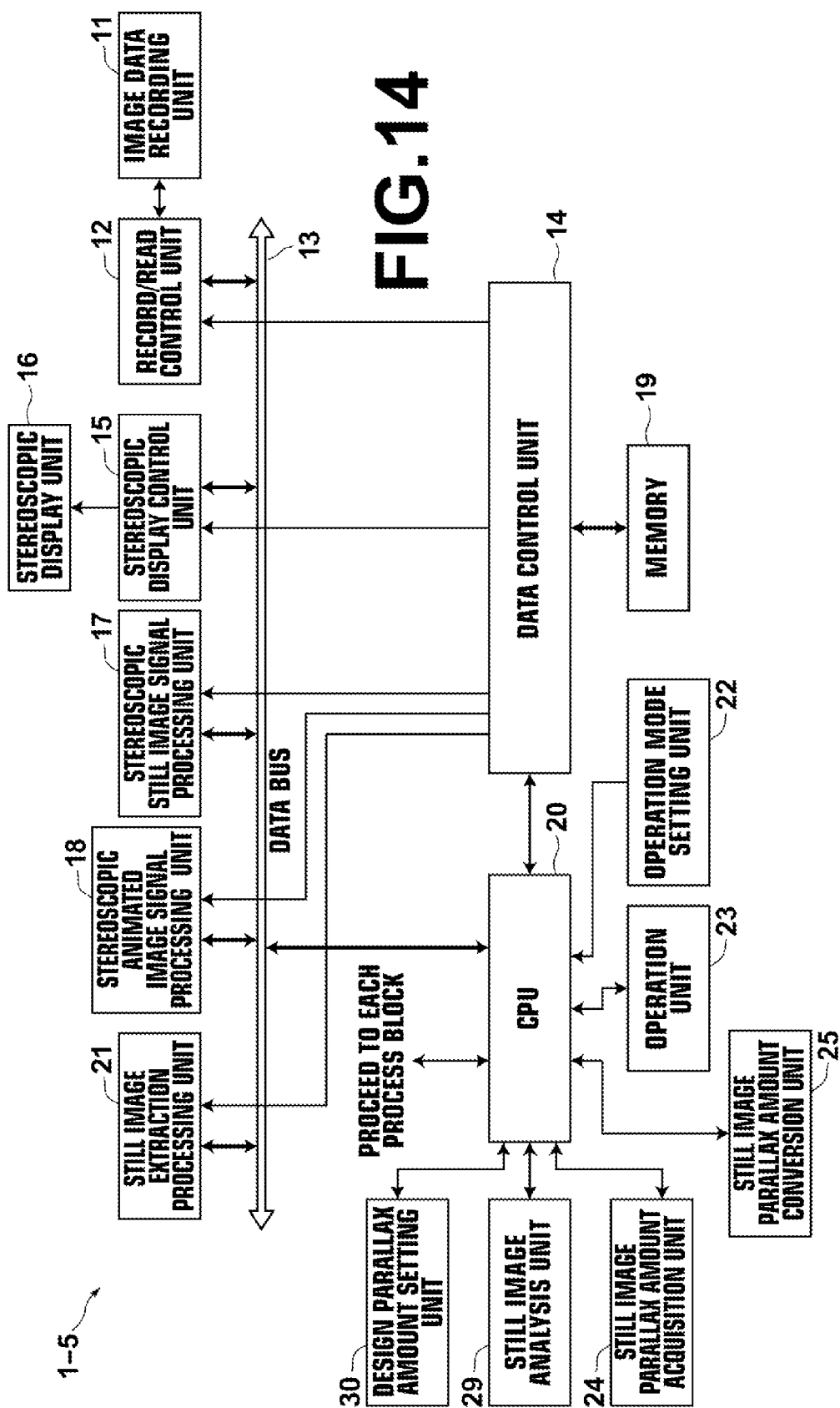
FIG. 14 is a block diagram that illustrates the configuration of a stereoscopic image processing device according to a fifth embodiment.

Next, a stereoscopic image processing device 1-5 according to a fifth embodiment will be described below with reference to the drawings. FIG. 14 is a block diagram that illustrates the configuration of a stereoscopic image processing device 1-5, FIG. 15 is a flow chart that illustrates a stereoscopic image processing device 1-5 of FIG. 13. It should be noted that constituent elements of the stereoscopic image processing device 1-5 according to the present embodiment as shown in FIG. 14 which are common to the stereoscopic image processing device 1 according to the above embodiment as shown in FIG. 1 will be designated by the same reference numerals, and descriptions thereof will be omitted. Only different elements will be described.

The stereoscopic image processing device 1-5 according to the present embodiment further includes a composition parallax amount setting unit 29 and a still image analysis unit 30, in addition to the configuration of FIG. 1, as shown in FIG. 14. The composition parallax amount setting unit 30 is designed to set an amount of parallax for each composition within stereoscopic still images. For example, regarding a composition in which a subject occupying a predetermined area or more exists in the front of the cross point where the amount of parallax becomes 0, the amount of parallax should be set smaller than that of a composition in which the subject does not exist. In this case, the predetermined area corresponds to approximately one third of the entire area of the screen. Further, regarding a composition having a continuous and intermittent pattern in a depth direction and including a subject which occupies an area less than a predetermined area, the amount of parallax should be set larger than that of the composition in which the subject does not exist. Note that in this case, the predetermined area corresponds to approximately one tenth of the entire area of the screen.

The still image analysis unit 30 is designed to analyze the stereoscopic still images presented by the stereoscopic still image data which have been extracted by the still image extraction processing unit 21 and to calculate the area of a subject existing in the front side of the display screen, i.e., the cross point in the stereoscopic still image, by using the amount of parallax acquired by the still image parallax amount acquisition unit 24. In this case, The calculation of an area includes detecting the amount of parallax in the front side of the cross point among the amounts of parallax acquired by the still image parallax amount acquisition unit 24 and calculating a percentage of points (feature points) having the detected amount of parallax within the entire image. Note that in the present embodiment, in the case that this percentage is one third or greater, it is judged that the stereoscopic still image has a composition in which the subject occupying an area more than the predetermined area exists in the front side of the cross point.

Further, an area of a subject having a continuous and intermittent pattern in a depth direction in the stereoscopic still image is calculated by using the amount of parallax acquired by the still image parallax amount acquisition unit 24. The calculation of the area includes detecting the amount of parallax, which increases continuously and intermittently, among the amounts of parallax acquired by the still image parallax amount acquisition unit 24, and calculating a percentage of points (feature points) having the detected amount of parallax within the entire image. In this case, the parallax which increases continuously and intermittently refers to the amount of parallax which gradually extends up to the upper side or the amount of parallax which gradually heads down to the bottom side in FIG. 4, for example.

Further, in the present embodiment, in the case that this percentage is smaller than one tenth, it is judged that the stereoscopic still image has a composition having a continuous and intermittent pattern in a depth direction and including a subject which occupies a predetermined area or less.

Next, a stereoscopic image processing method using the stereoscopic image processing device 1-5 according to the present embodiment will be described below with reference to the drawings. It should be noted that the processes in step S50 through step S55 of FIG. 15 are the same as those in step S10 through step S15 of FIG. 2 and the process in step S58 of FIG. 15 is the same as that in step S17 of FIG. 2, and therefore descriptions thereof will be omitted.

In the stereoscopic image processing device 1-5, the still image parallax amount acquisition unit 24 acquires the amount of parallax of the stereoscopic still images represented by the stereoscopic still image data which have been extracted by the still image parallax amount acquisition unit 24 (S55), and then the still image analysis unit 29 analyzes a composition of the stereoscopic still images as described above (S56).

Next, the still image parallax amount conversion unit 25 convert the amount of parallax acquired by the still image parallax amount acquisition unit 24 based on the result of the analysis by the still image analysis unit 29.

The still image parallax amount conversion unit 25 increases the amount of parallax of each frame $f_n$ extracted from the stereoscopic animated image data, i.e., the amount of parallax of the stereoscopic still images, and further decrease the converted amount of parallax in the case that the still image analysis unit 29 judges that the image has a composition in which a subject occupying a predetermined area or more exists in the front of the cross point where the amount of parallax becomes 0, because it is hard for the user to view the stereoscopic still image having a large parallax. In addition, in the case that it is judged that the stereoscopic still image has a composition having a continuous and intermittent pattern in a depth direction and including a subject which occupies a predetermined area or less, the amount of parallax is converted to be larger because this composition is judged to provide sufficient stereoscopic effects.

As described above, observers can obtain sufficient stereoscopic effects according to the composition of the stereoscopic still images when reproducing them by converting the amount of parallax of the stereoscopic still image data so as to be larger than that of the stereoscopic animated images according to the composition of the stereoscopic images. At this time, in the case that the stereoscopic animated image data of the extraction source is constituted by the amount of parallax within the allowable parallax range $D_m$, in which the safety of the human body is secured, both safety of the human body related to the stereoscopic animated images and the advantageous effect of stereoscopic effect related to the stereoscopic still images can be realized.

Further, the present invention is not limited to the content of the above embodiments, but may be changed appropriately without deviation from the spirit of the invention.

What is claimed is:

1. A stereoscopic image processing device, which is capable of separately displaying and/or recording a stereoscopic animated image and a stereoscopic still image, comprising:
   a processor that separately processes the display and/or recording of said stereoscopic still image from said stereoscopic animated image by controlling:
      a stereoscopic still image extraction device that extracts stereoscopic still image data representing any stereoscopic still image from a predetermined stereoscopic animated data;
      a still image parallax amount acquisition device that acquires the amount of parallax of the stereoscopic still image represented by the stereoscopic still image data which has been extracted by the stereoscopic still image extraction device; and
      a still image parallax amount conversion device that converts the amount of parallax of the stereoscopic still image data so as to be larger than the amount of parallax acquired by the still image parallax amount acquisition device,
   wherein the still image parallax amount conversion unit may convert the amount of parallax of the stereoscopic still image data by multiplying a ratio between the width of the allowable parallax range of the stereoscopic still image and the width of the allowable parallax range of the stereoscopic animated image so as to be larger than the parallax acquired by the still image parallax amount acquisition unit.

2. The stereoscopic image processing device as claimed in claim 1, wherein the still image parallax amount conversion device may convert the amount of parallax of the stereoscopic still image data so as to be larger than the amount of parallax acquired by the still image parallax amount acquisition device and such that a maximum value and a minimum value of the amount of parallax of the stereoscopic still image correspond to an upper limit value and a lower limit value of an allowable parallax range of the stereoscopic still image, respectively.

3. The stereoscopic image processing device as claimed in claim 2, wherein a width from a cross point at which the amount of parallax becomes 0 to the upper limit value of the allowable parallax range may be different from a width from the cross point to the lower limit value of the allowable parallax range.

4. The stereoscopic image processing device as claimed in claim 1, wherein the still image parallax amount conversion unit may convert the amount of parallax of the stereoscopic still image data by multiplying a ratio between the width of the allowable parallax range of the stereoscopic still image and the width of the allowable parallax range of the stereoscopic animated image so as to be larger than the parallax acquired by the still image parallax amount acquisition unit.

5. The stereoscopic image processing device as claimed in claim 1, wherein the ratios to be multiplied may differ between in the front side and in the back side of the cross point at which the amount of parallax becomes 0.

6. A stereoscopic image processing device, which is capable of separately displaying and/or recording a stereoscopic animated image and a stereoscopic still image, comprising:
   a processor that separately processes the display and/or recording of said stereoscopic still image from said stereoscopic animated image by controlling:
      a stereoscopic still image extraction device that extracts stereoscopic still image data representing any stereoscopic still image from a predetermined stereoscopic animated data;
      a still image parallax amount acquisition device that acquires the amount of parallax of the stereoscopic still image represented by the stereoscopic still image data which has been extracted by the stereoscopic still image extraction device; and
      a still image parallax amount conversion device that converts the amount of parallax of the stereoscopic still image data so as to be larger than the amount of parallax acquired by the still image parallax amount acquisition device,
      an intended use setting device that sets an intended use of the stereoscopic still image represented by the stereoscopic still image data which has been extracted by the stereoscopic still image extraction device; and wherein the still image parallax amount conversion device may convert the amount of parallax of the stereoscopic still image data so as to be larger than the amount of parallax acquired by the still image parallax amount acquisition device, on the basis of the intended use set by the intended use setting device,
   wherein the intended use setting device is capable of setting printing and screen display as the intended use, and the still image parallax amount conversion device may make the converted amount of parallax smaller than that when screen display is set, in the case that the intended use setting device sets the intended use to printing.

7. The stereoscopic image processing device as claimed in claim 6, wherein the intended use setting device is capable of setting the screen display for each of a plurality of sizes of display surfaces as the intended use, and the still image parallax amount conversion device may reduce the converted amount of parallax more as the size of the display surface for screen display, which has been set, becomes greater, in the case that the intended use setting device sets the intended use to screen display.

8. The stereoscopic image processing device as claimed in claim 6, wherein the intended use setting device is capable of setting the screen display for each of a plurality of sizes of display surfaces as the intended use, and the still image parallax amount conversion device may reduce the converted amount of parallax more as the size of the display surface for screen display, which has been set, becomes greater, in the case that the intended use setting device sets the intended use to screen display.

9. A stereoscopic image processing device, which is capable of separately displaying and/or recording a stereoscopic animated image and a stereoscopic still image, comprising:
   a processor that separately processes the display and/or recording of said stereoscopic still image from said stereoscopic animated image by controlling:

a stereoscopic still image extraction device that extracts stereoscopic still image data representing any stereoscopic still image from a predetermined stereoscopic animated data;

a still image parallax amount acquisition device that acquires the amount of parallax of the stereoscopic still image represented by the stereoscopic still image data which has been extracted by the stereoscopic still image extraction device; and a still image parallax amount conversion device that converts the amount of parallax of the stereoscopic still image data so as to be larger than the amount of parallax acquired by the still image parallax amount acquisition device, a still image analysis device that analyzes the composition of the stereoscopic still image represented by the stereoscopic still image data which has been extracted by the stereoscopic still image extraction device; and wherein the still image parallax amount conversion device may convert the amount of parallax of the stereoscopic still image data so as to be larger than the amount of parallax acquired by the still image parallax amount acquisition device, on the basis of analysis results by the still image analysis device, wherein the still image parallax amount conversion device may make the converted amount of parallax smaller than that of a composition in which a subject does not exist, in the case that the still image analysis device judges that the stereoscopic still image represented by the stereoscopic still image data, which has been extracted by the stereoscopic still image extraction device, has a composition, in which a subject occupying a predetermined area or more exists in the front of the cross point where the amount of parallax becomes 0.

10. A stereoscopic image processing device, which is capable of separately displaying and/or recording a stereoscopic animated image and a stereoscopic still image, comprising:

a processor that separately processes the display and/or recording of said stereoscopic still image from said stereoscopic animated image by controlling:

a stereoscopic still image extraction device that extracts stereoscopic still image data representing any stereoscopic still image from a predetermined stereoscopic animated data;

a still image parallax amount acquisition device that acquires the amount of parallax of the stereoscopic still image represented by the stereoscopic still image data which has been extracted by the stereoscopic still image extraction device; and a still image parallax amount conversion device that converts the amount of parallax of the stereoscopic still image data so as to be larger than the amount of parallax acquired by the still image parallax amount acquisition device, a still image analysis device that analyzes the composition of the stereoscopic still image represented by the stereoscopic still image data which has been extracted by the stereoscopic still image extraction device; and wherein the still image parallax amount conversion device may convert the amount of parallax of the stereoscopic still image data so as to be larger than the amount of parallax acquired by the still image parallax amount acquisition device, on the basis of analysis results by the still image analysis device, wherein the still image parallax amount conversion device may make the converted amount of parallax larger than that of a composition in which a subject does not exist, in the case that the still image analysis device judges that the stereoscopic still image represented by the stereoscopic still image data which has been extracted by the stereoscopic still image extraction device has a composition having a continuous and intermittent pattern in a depth direction and including a subject which occupies a predetermined area or less.

11. A stereoscopic image processing method that utilizes the stereoscopic image processing device separately capable of displaying and/or recording a stereoscopic animated image and a stereoscopic still image comprising the steps of:

processing separately the displaying and/or recording of said stereoscopic still image from said stereoscopic animated image by:

extracting stereoscopic still image data representing any stereoscopic still image from a predetermined stereoscopic animated data;

acquiring the amount of parallax of the stereoscopic still image represented by the extracted stereoscopic still image data; and converting the amount of parallax of the stereoscopic still image data so as to be larger than the acquired amount of parallax, wherein the still image parallax amount conversion unit may convert the amount of parallax of the stereoscopic still image data by multiplying a ratio between the width of the allowable parallax range of the stereoscopic still image and the width of the allowable parallax range of the stereoscopic animated image so as to be larger than the acquired parallax acquired.

12. The stereoscopic image processing method as claimed in claim 11, wherein the amount of parallax of the stereoscopic still image data may be converted so as to be larger than the acquired amount of parallax and such that a maximum value and a minimum value of the amount of parallax of the stereoscopic still image correspond to an upper limit value and a lower limit value of an allowable parallax range of the stereoscopic still image, individually.

13. The stereoscopic image processing method as claimed in claim 12, wherein a width from the cross point at which the amount of parallax becomes 0 to the upper limit value of the allowable parallax range may be different from a width from the cross point to the lower limit value of the allowable parallax range.

14. The stereoscopic image processing method as claimed in claim 11, wherein the ratios to be multiplied may differ between in the front side and in the back side of the cross point at which the amount of parallax becomes 0.

15. A stereoscopic image processing method that utilizes the stereoscopic image processing device separately capable of displaying and/or recording a stereoscopic animated image and a stereoscopic still image comprising the steps of:

processing separately the displaying and/or recording of said stereoscopic still image from said stereoscopic animated image by:

extracting stereoscopic still image data representing any stereoscopic still image from a predetermined stereoscopic animated data;

acquiring the amount of parallax of the stereoscopic still image represented by the extracted stereoscopic still image data; and converting the amount of parallax of the stereoscopic still image data so as to be larger than the acquired amount of parallax, setting an intended use of the stereoscopic still image represented by the stereoscopic still image data which has been extracted in advance; and converting the amount of parallax of the stereoscopic still image data so as to be larger than the acquired amount of parallax, on the basis of the set intended use, wherein the converted amount of parallax may be smaller than that of the case where the intended use is set to screen display, when the intended use is set to printing.

16. The stereoscopic image processing method as claimed in claim 15, wherein the greater the size of the display surface for screen display which has been set is, the smaller the converted amount of parallax is set, in the case that the intended use is set to screen display.

17. The stereoscopic image processing method as claimed in claim 15, wherein the greater the size of the display surface for screen display which has been set is, the smaller the converted amount of parallax is set, in the case that the intended use is set to screen display.

18. A stereoscopic image processing method that utilizes the stereoscopic image processing device separately capable of displaying and/or recording a stereoscopic animated image and a stereoscopic still image comprising the steps of:

processing separately the displaying and/or recording of said stereoscopic still image from said stereoscopic animated image by:

extracting stereoscopic still image data representing any stereoscopic still image from a predetermined stereoscopic animated data;

acquiring the amount of parallax of the stereoscopic still image represented by the extracted stereoscopic still image data; and converting the amount of parallax of the stereoscopic still image data so as to be larger than the acquired amount of parallax, analyzing the composition of the stereoscopic still image represented by the extracted stereoscopic still image data; and converting the amount of parallax of the stereoscopic still image data so as to be larger than the acquired amount of parallax, on the basis of the analysis results;

wherein the converted amount of parallax may be set smaller than that of a composition, in which a subject does not exist, in the case that it is judged that the stereoscopic still image represented by the extracted stereoscopic still image data has a composition, in which a subject occupying an area less than a predetermined area exists in the front of the cross point where the amount of parallax becomes 0.

19. A stereoscopic image processing method that utilizes the stereoscopic image processing device separately capable of displaying and/or recording a stereoscopic animated image and a stereoscopic still image comprising the steps of:

processing separately the displaying and/or recording of said stereoscopic still image from said stereoscopic animated image by:

extracting stereoscopic still image data representing any stereoscopic still image from a predetermined stereoscopic animated data;

acquiring the amount of parallax of the stereoscopic still image represented by the extracted stereoscopic still image data; and converting the amount of parallax of the stereoscopic still image data so as to be larger than the acquired amount of parallax, analyzing the composition of the stereoscopic still image represented by the extracted stereoscopic still image data; and converting the amount of parallax of the stereoscopic still image data so as to be larger than the acquired amount of parallax, on the basis of the analysis results, wherein the converted amount of parallax may be set larger than that of a composition in which a subject does not exist, in the case that it is judged that the stereoscopic still image represented by the extracted stereoscopic still image data has a composition having a continuous and intermittent pattern in a depth direction and including a subject which occupies a predetermined area or less.

* * * * *